(12) United States Patent
Sato et al.

(10) Patent No.: US 10,756,636 B2
(45) Date of Patent: Aug. 25, 2020

(54) POWER CONTROL DEVICE SWITCHABLE BETWEEN MULTIPLE OPERATING MODES HAVING DIFFERENT POWER CONSUMPTION

(71) Applicant: Rohm Co., Ltd., Kyoto (JP)

(72) Inventors: Yoshinori Sato, Kyoto (JP); Satoru Nate, Kyoto (JP); Yuta Shiroishi, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 16/232,442

(22) Filed: Dec. 26, 2018

(65) Prior Publication Data

US 2019/0207522 A1 Jul. 4, 2019

(30) Foreign Application Priority Data

Dec. 28, 2017 (JP) .................... 2017253648
Dec. 28, 2017 (JP) .................... 2017253655
Oct. 22, 2018 (JP) .................... 2018198224

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 2001/0025* (2013.01); *H02M 2001/0032* (2013.01)

(58) Field of Classification Search
CPC .......... H02M 3/33523; H02M 3/3353; H02M 3/33507; H02M 1/08; H02M 2001/0032
See application file for complete search history.

(56) References Cited

U.S. PATENT DOCUMENTS

| 5,903,138 A | * | 5/1999 | Hwang | ............... H02M 3/3353 323/224 |
| 9,379,616 B2 | * | 6/2016 | Chung | .................... H02M 1/08 |
| 2013/0033902 A1 | * | 2/2013 | Zhang | ............... H02M 3/33523 363/15 |
| 2013/0128627 A1 | * | 5/2013 | Moon | ............... H02M 3/33507 363/21.17 |
| 2014/0307478 A1 | * | 10/2014 | Leisten | ............. H02M 3/33523 363/15 |

FOREIGN PATENT DOCUMENTS

JP        2014-112996        6/2014

* cited by examiner

*Primary Examiner* — Matthew V Nguyen
*Assistant Examiner* — Jye-June Lee
(74) *Attorney, Agent, or Firm* — Fish & Richardson P.C.

(57) ABSTRACT

A power control device that acts as a principal controlling agent in an isolating switching power supply has a controller configured to monitor a first output detection signal commensurate with a direct-current output voltage to a load and a second output detection signal commensurate with the difference between the direct-current output voltage and its target value switch among a plurality of operating modes with varying power consumption according to the results of monitoring of the two output detection signals. The power control device may instead have a peak current switch configured to raise the peak current value of a primary current passing in an output switch on detecting a light load.

18 Claims, 13 Drawing Sheets

US 10,756,636 B2

POWER CONTROL DEVICE SWITCHABLE BETWEEN MULTIPLE OPERATING MODES HAVING DIFFERENT POWER CONSUMPTION

CROSS-REFERENCE TO RELATED APPLICATIONS

This application is based on the following Japanese Patent Applications, the contents of which are hereby incorporated by reference:
(1) Japanese Patent Application published as No. 2017-253648 (filed on Dec. 28, 2017
(2) Japanese Patent Application published as No. 2017-253655 (filed on Dec. 28, 2017
(3) Japanese Patent Application published as No. 2018-198224 (filed on Oct. 22, 2018

BACKGROUND OF THE INVENTION

1. Field of the Invention

The invention disclosed herein relates to power control devices.

2. Description of Related Art

Conventionally, power control devices (what is called power ICs) are widely used as a principal controlling agent in isolating switching power supplies.

One example of conventional technology related to what has just been mentioned is seen in Japanese Patent Application published as No. 2014-112996.

Inconveniently, conventional power control devices leave room for improvement in terms of reduction of power consumption under a light or no load.

SUMMARY OF THE INVENTION

In view of the above-mentioned problem encountered by the present inventors, an object of the present invention is to provide a power control device with reduced power consumption under a light or no load.

According to one aspect of what is disclosed herein, a power control device acts as a principal controlling agent in an isolating switching power supply, and includes: a controller configured to monitor a first output detection signal commensurate with a direct-current output voltage to a load and a second output detection signal commensurate with the difference between the direct-current output voltage and its target value to switch among a plurality of operating modes with varying power consumption in accordance with the results of monitoring of the first and second output detection signals.

According to another aspect of what is disclosed herein, a power control device acts as a principal controlling agent in an isolating switching power supply, and includes: a peak current switch configured to raise the peak current value of a primary current passing in an output switch on detecting a light load.

Other features, elements, steps, benefits, and characteristics of the present invention will become clearer with reference to the following description of preferred embodiments thereof in conjunction with the accompanying drawings.

DETAILED DESCRIPTION OF PREFERRED EMBODIMENTS

<Isolating Switching Power Supply>

Figure 1:
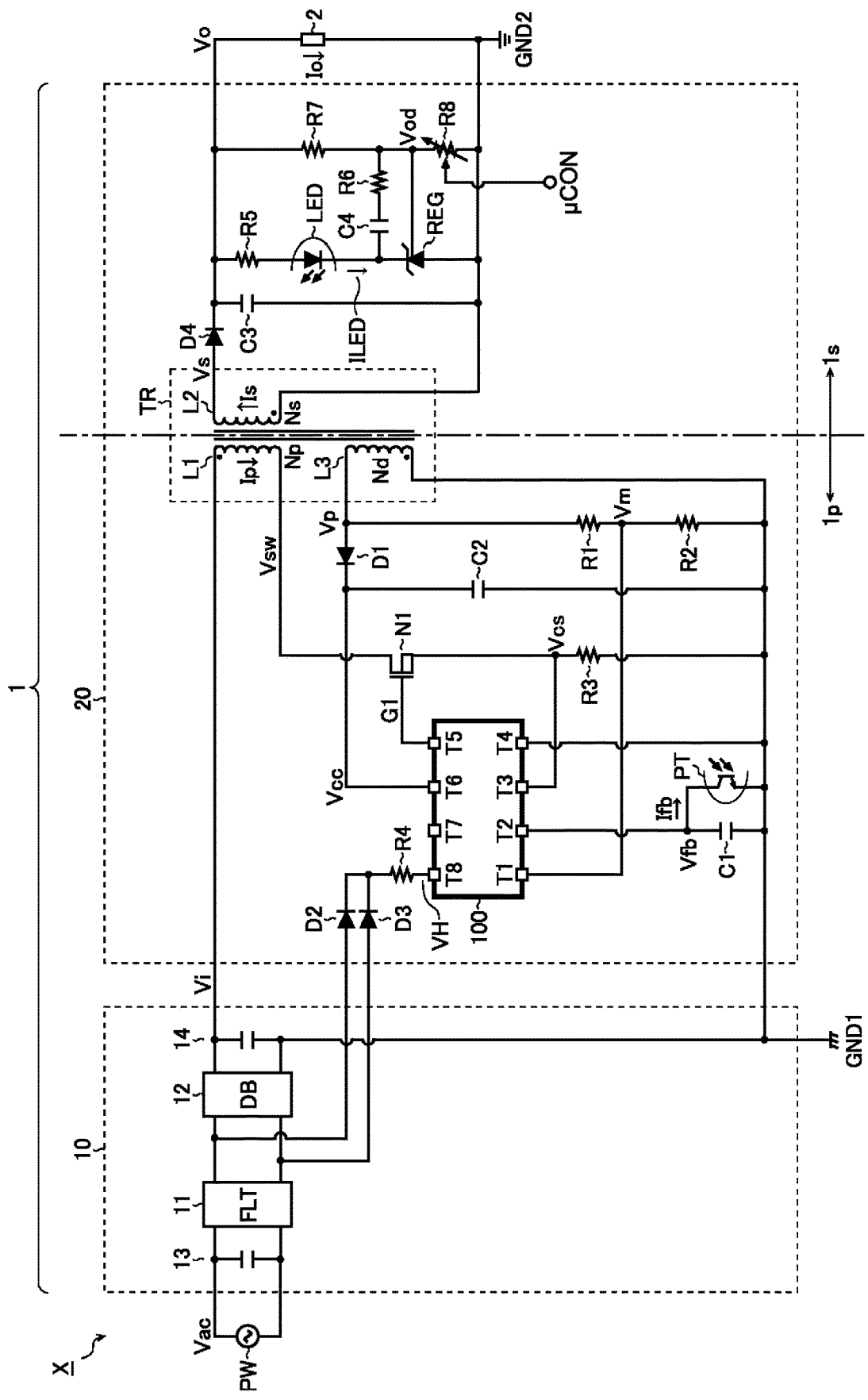
FIG. 1 is a diagram showing an overall configuration of an electronic appliance provided with an isolating switching power supply.

FIG. 1 is a diagram showing an overall configuration of an electronic appliance provided with an isolating switching power supply. The electronic appliance X of this configuration example includes an isolating switching power supply 1 and a load 2, the load 2 operating by being supplied with electric power from the isolating switching power supply 1.

The isolating switching power supply 1 is a means for, while isolating a primary circuit system 1p (GND1 system) and a secondary circuit system is (GND2 system) from each other, converting an alternating-current input voltage Vac (for example, AC 85 to 265 V) supplied from a commercial alternating-current power source to the primary circuit system 1p into a desired direct-current output voltage Vo (for example, DC 10 to 30 V) and then feeding this to the load 2 in the secondary circuit system 2p. The isolating switching power supply 1 includes a rectifier 10 and a DC-DC converter 20.

The rectifier 10 is a circuit block that generates from the alternating-current input voltage Vac a direct-current input voltage Vi (for example, DC 120 to 375 V) and feeds this to the DC-DC converter 20. The rectifier 10 includes a filter 11, a diode bridge 12, and capacitors 13 and 14. The filter 11 eliminates noise and surges from the alternating-current input voltage Vac. The diode bridge 12 performs full-wave rectification on the alternating-current input voltage Vac to generate the direct-current input voltage Vi. The capacitor 13 eliminates harmonic noise from the alternating-current input voltage Vac. The capacitor 14 smooths the direct-current input voltage Vi. In a stage preceding the rectifier 10, a protective element such as a fuse may be provided. In a case where a direct-current input voltage Vi is directly supplied to the isolating switching power supply 1, the rectifier 10 may be omitted.

The DC-DC converter 20 is a circuit block that generates from the direct-current input voltage Vi the desired direct-current output voltage Vo and feeds this to the load 2. The DC-DC converter 20 includes a power IC 100 and various discrete components externally fitted to it (a transformer TR, resistors R1 to R8, capacitors C1 to C4, diodes D1 to D4, an N-channel MOS (metal-oxide-semiconductor) field-effect transistor N1, a light-emitting diode LED, a phototransistor PT, and a shunt regulator REG).

The transformer TR includes a primary winding L1 (with a number of turns Np) and a secondary winding L2 (with a number of turns Ns) that are magnetically coupled together with opposite polarities while electrically isolating the primary and secondary circuit systems 1p and is from each other. The transformer TR also includes, as a means for generating a supply voltage Vcc for the power IC 100, an auxiliary winding L3 (with a number of turns Nd) provided in the primary circuit system 1p.

The first terminal of the primary winding L1 is connected to a terminal to which the direct-current input voltage Vi is applied (that is, the output terminal of the diode bridge 12). The second terminal of the primary winding L1 is connected to the drain of the transistor N1. The first terminal of the secondary winding L2 is connected to the anode of the diode D4. The second terminal of the secondary winding L2 is connected to a ground terminal GND2 of the secondary circuit system 1s.

The numbers of turns Np and Ns can be adjusted appropriately such that the desired direct-current output voltage Vo is obtained. For example, the larger the number of turns Np, or the smaller to number of turns Ns, the lower the direct-current output voltage Vo; reversely, the smaller the number of turns Np, or the larger the number of turns Ns, the higher the direct-current output voltage Vo.

The power IC 100 is a semiconductor integrated circuit device provided in the primary circuit system 1p, and corresponds to a power control device that acts as the principal controlling agent in the isolating switching power supply 1 (and the DC-DC converter 20 in particular). The power IC 100 has external terminals T1 to T8 as a means for establishing electrical connection with the outside of the device. Needless to say, the power IC 100 may have any external terminals other than those just mentioned.

The external terminal T1 (an auxiliary winding monitor/external latch stop terminal) is connected to the connection node between the resistors R1 and R2 (that is, a terminal to which a monitor voltage Vm is applied). The resistors R1 and R2 are connected in series between, of the auxiliary winding L3, the first terminal (which corresponds to a terminal to which an induced voltage Vp is applied) and the second terminal (that is, a ground terminal GND1 of the primary circuit system 1p). Interconnected in this way, the resistors R1 and R2 function as a voltage divider that outputs, from the connection node between them, a monitor voltage Vm ($=[R2/(R1+R2)]\times Vp$) commensurate with the induced voltage Vp in the auxiliary winding L3.

Here, let the voltage value of the induced voltage Vp during the on-period of the transistor N1 be Vpon, and let the voltage value of the induced voltage Vp during the off-period of the transistor N1 be Vpoff; then $Vpon \approx -Vi \times (Nd/Np)$ and $Vpoff \approx Vo \times (Nd/Ns)$.

That is, the voltage value Vpon varies according to the direct-current input voltage Vi, and the voltage value Vpoff varies depending on the direct-current output voltage Vo. Accordingly, for example, in the off-period of the transistor N1, by monitoring the monitor voltage Vm, which is commensurate with the induced voltage Vp, it is possible to subject the direct-current output voltage Vo to overvoltage protection, or to switch operating modes (of which details will be given later) according to the direct-current output voltage Vo.

As described above, the group of circuit elements (TR and R1 to R2) described above functions as a first output detector that generates a monitor voltage Vm (corresponding to a first output detection signal) commensurate with the absolute value of the direct-current output voltage Vo.

The external terminal T2 (a feedback signal input terminal) is connected to the collector of the phototransistor PT and to the first terminal of the capacitor C1. The emitter of the phototransistor PT and the second terminal of the capacitor C1 are both connected to the ground terminal GND1. The phototransistor PT, along with the light-emitting diode LED provided in the secondary circuit system 1s, functions as a photocoupler, and generates a feedback current Ifb commensurate with the optical signal from the light-emitting diode LED.

The external terminal T3 (a primary current sense terminal) is connected to the source and the backgate of the transistor N1 and to the first terminal of the resistor R3. The second terminal of the resistor R3 is connected to the ground terminal GND1. The resistor R3 functions as a sense resistor for detecting a primary current Ip passing in the transistor N1 as a sense voltage Vcs ($=Ip \times R3$).

The external terminal T4 (a ground terminal) is connected to the ground terminal GND1.

The external terminal T5 (an externally fitted MOS drive terminal) is connected to the gate of the transistor N1, and via the external terminal T5, a gate signal G1 is output to the outside. The transistor N1 is an output switch for turning on and off the primary current Ip passing in the primary winding L1 by switching between a conducting state and a cut-off state the current path from the application terminal of the direct-current input voltage Vi via the primary winding L1 to the ground terminal GND1. The transistor N1 is on when the gate signal G1 is at high level, and is off when the gate signal G1 is at low level.

The external terminal T6 (a power terminal) is connected to the connection node between the cathode of the diode D1 and the first terminal of the capacitor C2 (that is, a node to which a supply voltage Vcc is applied). The anode of the diode D1 is connected to the first terminal of the auxiliary winding L3. The second terminal of the capacitor C2 is connected to the ground terminal GND1. Interconnected in this way, the diode D1 and the capacitor C2 function as a supply voltage generator that generates the supply voltage Vcc for the power IC 100 by rectifying and smoothing the induced voltage Vp appearing in the auxiliary winding L3. The winding ratio of the primary winding L1 to the auxiliary winding L3 can be set appropriately with consideration given to the supply voltage Vcc required by the power IC 100.

The external terminal T7 (a non-connect terminal) is connected to nowhere.

The external terminal T8 (a start-up/AC input voltage monitor terminal) is connected to the first terminal of the resistor R4 (that is, a terminal to which a high voltage VH is applied). The second terminal of the resistor R4 is connected to the cathodes of both the diodes D2 and D3. The anodes of the diodes D2 and D3 are connected to the positive and negative input terminals, respectively, of the diode bridge 12 (that is, terminals to which the alternating-current input voltage Vac is applied).

Next, the interconnection of the circuit elements provided in the secondary circuit system is will be described.

As mentioned above, the anode of the diode D4 is connected to the first terminal of the secondary winding L2. The cathode of the diode D4 and the first terminal of the capacitor C3 are both connected to a terminal from which the direct-current output voltage Vo is output. The second terminal of the capacitor C3 is connected to the ground terminal GND2. Interconnected in this way, the diode D4 and the capacitor C3 function as a rectifier-smoother that generates the direct-current output voltage Vo by rectifying and smoothing an induced voltage Vs appearing in the secondary winding L2.

The first terminal of the resistor R5 is connected to the output terminal of the direct-current output voltage Vo. The second terminal of the resistor R5 is connected to the anode of the light-emitting diode LED. The cathode of the light-emitting diode LED is connected to the cathode of the shunt regulator REG. The anode of the shunt regulator REG is connected to the ground terminal GND2. The gate (corresponding to a control terminal) of the shunt regulator REG is connected to the connection node between the resistors R7 and R8 which are connected in series between the output terminal of the direct-current output voltage Vo and the ground terminal GND2 (the connection node thus being a terminal to which a divided voltage Vod is applied, where Vod=[R8/(R7+R8)]×Vo). The resistor R6 and the capacitor C4 are connected in series between the gate and the cathode of the shunt regulator REG.

The shunt regulator REG controls a driving current ILED for the light-emitting diode LED so as to cause an imaginary short circuit between the divided voltage Vod, which is applied to the gate of the shunt regulator REG, and a predetermined internal reference voltage VoREF.

More specifically, when Vod>VoREF, the larger their difference (=|Vod−VoREF|), the more the driving current ILED is increased. As a result the intensity of light emission of the light-emitting diode LED increases, and thus the feedback current Ifb that passes in the phototransistor PT increases. On the other hand, when Vod<VoREF, the larger their difference (=|Vod−VoREF|), the more the driving current ILED is reduced. As a result, the intensity of light emission of the light-emitting diode LED diminishes, and thus the feedback current Ifb passing in the phototransistor PT diminishes.

Thus, the above-described group of circuit elements (R5 to R8, C4, LED, REG, and PT) functions as a second output detector that generates a feedback current Ifb (corresponding to a second output detection signal) commensurate with the difference between the direct-current output voltage Vo and its target value (=[(R7+R8)/R8]×VoREF).

The isolating switching power supply 1 of this configuration example incorporates a function of controlling the varying of the direct-current output voltage Vo according to the operating status of the electronic appliance X. Implementing such a function helps achieve a reduction in the standby power consumption of the electronic appliance X.

It should be noted that the power IC 100 provided in the primary circuit system 1*p* does not have a function of setting a target value of the direct-current output voltage Vo. Accordingly, the control for varying the direct-current output voltage Vo is performed in the secondary circuit system 1*s*. Although FIG. 1 shows, as an example, a configuration where the varying of the direct-current output voltage Vo is controlled by switching the voltage division ratio of the divided voltage Vod through the adjustment of the resistance value of the resistor R8 with a microcomputer, this is in no way meant to limit how the varying of the direct-current output voltage Vo is controlled.

In the DC-DC converter 20 configured as described above, the transistor N1, the transformer TR, the diode D4, and the capacitor C3 function as a step-down switching output stage of a flyback type that generates the direct-current output voltage Vo from the direct-current input voltage Vi.

The step-down operation of the switching output stage will now be described in brief. When the transistor N1 is on, a primary current Ip passes from the application terminal of the direct-current input voltage Vi via the primary winding L1, then the transistor N1, and then the resistor R3 to the ground terminal GND1, and thus electrical energy is stored in the primary winding L1.

Then, when the transistor N1 is turned off, an induced voltage Vs appears in the secondary winding L2, which is magnetically coupled with the primary winding L1; thus a secondary current Is passes from the secondary winding L2 via the diode D4 to the ground terminal GND2. Consequently, the load 2 is supplied with a direct-current output voltage Vo resulting from the induced voltage Vs in the secondary winding L2 being rectified and smoothed.

Thereafter, the transistor N1 is turned on and off likewise, so that switching operation similar to that just described is repeated.

As described above, with the isolating switching power supply 1 according to this configuration example, it is possible, while electrically isolating the primary and secondary circuit systems 1*p* and is from each other, to generate from an alternating-current input voltage Vac a direct-current output voltage Vo and supply it to the load 2.

<Power IC>

Figure 2:
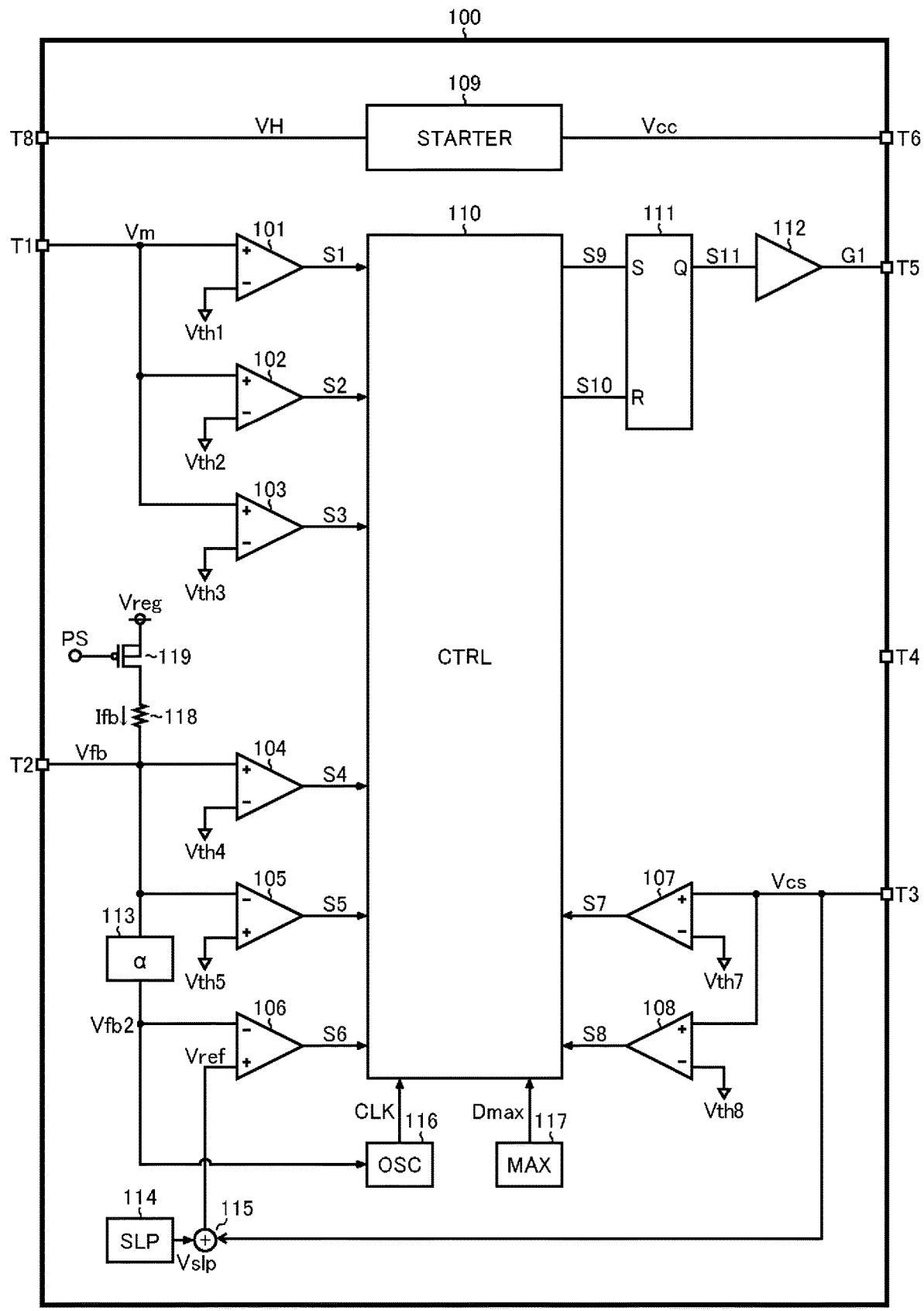
FIG. 2 is a diagram showing one configuration example of a power IC.

FIG. 2 is a diagram showing one configuration example of the power IC 100. The power IC 100 of this configuration example has integrated into it comparators 101 to 108, a starter 109, a controller 110, an RS flip-flop 111, a driver 112, a gain adjuster 113, a slope compensator 114, an adder 115, an oscillator 116, a maximum duty setter 117, a resistor 118, and a P-channel MOS field-effect transistor 119.

The comparator 101 generates an overvoltage detection signal S1 by comparing the monitor voltage Vm, which is fed from the external terminal T1 to the non-inverting input terminal (+) of the comparator 101, with a threshold voltage Vth1 (corresponding to an overvoltage detection value), which is fed to the inverting input terminal (−) of the comparator 101. The overvoltage detection signal S1 is at high level when Vm>Vth1, and is at low level when Vm<Vth1.

The comparator 102 generates a light-load detection signal S2 by comparing the monitor voltage Vm, which is fed from the external terminal T1 to the non-inverting input terminal (+) of the comparator 102, with a threshold voltage Vth2 (<Vth1, and corresponding to a light-load detection value), which is fed to the inverting input terminal (−) of the comparator 102. The light-load detection signal S2 is at high level when Vm>Vth2, and is at low level when Vm<Vth1.

The comparator 103 generates a no-load detection signal S3 by comparing the monitor voltage Vm, which is fed from the external terminal T1 to the non-inverting input terminal (+) of the comparator 103, with a threshold voltage Vth3 (<Vth2, and corresponding to a no-load detection value), which is fed to the inverting input terminal (−) of the comparator 103. The no-load detection signal S3 is at high level when Vm>Vth3, and is at low level when Vm<Vth3.

The comparator 104 generates an instant-return detection signal S4 by comparing a feedback voltage Vfb, which is fed from the external terminal T2 to the non-inverting input terminal (+) of the comparator 104, with a threshold voltage Vth4 (corresponding to an instant-return detection value), which is fed to the inverting input terminal (−) of the comparator 104. The instant-return detection signal S4 is at high level when Vfb>Vth4, and is at low level when Vfb<Vth4.

The comparator 105 generates a burst detection signal S5 by comparing the feedback voltage Vfb, which is fed from the external terminal T2 to the inverting input terminal (−) of the comparator 105, with a threshold voltage Vth5 (<Vth4, and corresponding to a burst detection value), which is fed to the non-inverting input terminal (+) of the comparator 105. Accordingly, the burst detection signal S5 is at high level when Vfb<Vth5, and is at low level when Vfb>Vth5, The comparator 106 generates an off-timing signal S6 by comparing a reference voltage Vref, which is fed from the adder 115 to the non-inverting input terminal (+) of the comparator 106, with a divided feedback signal Vfb2 (=α× Vfb, where 0<α<1), which is fed from the gain adjuster 113 to the inverting input terminal (−) of the comparator 106. The off-timing signal S6 is at high level when Vref>Vfb2, and is at low level when Vref<Vfb2.

The comparator 107 generates an overload detection signal S7 by comparing the sense voltage Vcs, which is fed from the external terminal T3 to the non-inverting input terminal (+) of the comparator 107, with a threshold voltage Vth7 (corresponding to an overload detection value), which is fed to the inverting input terminal (−) of the comparator 107. The overload detection signal S7 is at high level when Vcs>Vth7, and is at a low level when Vcs<Vth7.

The comparator 108 generates an overcurrent detection signal S8 by comparing the sense voltage Vcs, which is fed from the external terminal T3 to the non-inverting input terminal (+) of the comparator 108, with a threshold voltage Vth8 (corresponding to an overcurrent detection value), which is fed to the inverting input terminal (−) of the comparator 108. The overcurrent detection signal S8 is at high level when Vcs>Vth8, and is at low level when Vcs<Vth8.

Though not shown in FIG. 2, there can be provided a masking processor, in a stage preceding the comparators 107 and 108, that keeps the sense voltage Vcs at a zero value for a predetermined mask period after an output switch 129 is turned on. With this configuration, it is possible to avoid the influence of the ringing noise in the sense voltage Vcs that appears when the transistor N1 is on.

The starter 109 raises the supply voltage Vcc by charging or re-charging a capacitor C2 externally fitted to the external terminal T6 by using the high voltage VH at the external terminal T8 when the supply voltage Vcc falls to lower than a predetermined threshold voltage immediately after the start-up of the isolating switching power supply 1 or when the power IC 100 is operating in a light-load mode or in a no-load mode (of which details will be given later).

The controller 110 controls the operation of different parts in the power IC 100 on a concentrated fashion. For example, with respect to the control of the on-duty of the transistor N1, the controller 110 generates pulses in a set signal S9 and in a reset signal S10 based on a drive clock signal CLK (corresponding to an on-timing signal) fed from the oscillator 116, the off-timing signal S6 fed from the comparator 106, and a maximum duty setting signal Dmax fed from the maximum duty setter 117.

In terms of a function of protecting the power IC 100 from faults, the controller 110 holds the reset signal S10 at an off-time logic level to forcibly turn off the transistor N1 based on the overvoltage detection signal S1, the overload detection signal S7, and the overcurrent detection signal S8.

In terms of a function of switching the operating mode of the power IC 100 (of which details will be given later), the controller 110 switches among different operation modes (a regular mode and at least one power-saving mode) based on the light-load detection signal S2, the no-load detection signal S3, and the instant-return detection signal S4.

The controller 110 also has a function of determining whether or not to perform burst control (intermittent control) of the transistor N1 based on the burst detection signal S5. More specifically, basically, the controller 110 keeps the transistor N1 off so long as the burst detection signal S5 is at high level.

The RS flip-flop 111 switches the logic level of a PWM (pulse width modulation) signal S11, which is output from the output terminal (Q) of the RS flip-flop 111, according to the set signal S9, which is fed to the set terminal (S) of the RS flip-flop 111, and the reset signal S10, which is fed to the reset terminal (R) of the RS flip-flop 111. Specifically, the RS flip-flop 111 sets the PWM signal S11 to high level when the set signal S9 rises to high level, and resets the PWM signal S11 to low level when the reset signal S10 rises to high level.

The driver 112 receives the PWM signal S11 and generates the gate signal G1, and feeds this to the external terminal T5. More specifically, the driver 112 keeps the gate signal G1 at high level when the PWM signal S11 is at high level, and keeps the gate signal G1 at low level when the PWM signal S11 is at low level.

The gain adjuster 113 generates the divided feedback signal Vfb2 (=α×Vfb) by dividing the feedback voltage Vfb, which is fed from the external terminal T2, at a predetermined gain α (that is, at a voltage division factor α). The gain adjuster 113 has a function of switching the just-mentioned gain α according to the operating mode of the power IC 100 (details will be given later)

The slope compensator 114 generates a slope voltage Vslp with a triangular waveform, a sawtooth waveform, or an nth-order slope waveform in synchrony with the drive clock signal CLK.

The adder 115 generates the reference voltage Vref by adding up the sense voltage Vcs (that is, a voltage signal that mimics the behavior of the primary current Ip), which is fed from the external terminal T3, and the slope voltage Vslp, which is fed from the slope compensator 114. With this configuration, current-mode output feedback control is achieved; this helps enhance the stability of the output feedback loop, and helps improve the transient response characteristics in the event of a variation in the load. However, where voltage-mode output feedback control suffices, the adder 115 can be omitted.

The oscillator 116 generates the drive clock signal CLK for the controller 110, and feeds it to the power IC 100. The oscillator 116 can be equipped with a function of monitoring the divided feedback signal Vfb2 and raising the oscillation frequency of the drive clock signal CLK for a predetermined period under the peak load (that is, when the load is heavier than usual). This function helps reduce the cost of the transistor N1, and helps reduce the size of the transformer TR.

The maximum duty setter 117 generates a maximum duty setting signal Dmax and feeds it to the controller 110. The maximum duty setting signal Dmax serves to limit the on-duty Don (the proportion of the on-time Ton in the switching period T) of the transistor N1 such that it remains equal to or lower than a predetermined upper limit value.

The resistor 118 (with a resistance value R118) is connected between a terminal to which a regulated voltage Vreg is applied and the external terminal T2, and acts as a current-voltage conversion element that converts the feedback current Ifb passing at the external terminal T2 into the feedback voltage Vfb (=Vreg−Ifb×R118). Accordingly, the feedback voltage Vfb is the lower the higher the feedback current Ifb is, and is the higher the lower the feedback current Ifb is.

The source and the backgate of the transistor 119 are connected to the application terminal of the regulated voltage Vreg. The drain of the transistor 119 is connected to one terminal of the resistor 118. The gate of the transistor 119 is connected to a terminal to which a power save signal PS is fed. Connected in this way, the transistor 119 switches between a conducting state and a cut-off state the current path of the feedback current Ifb in accordance with the power save signal PS. More specifically, the transistor 119 is on when the power save signal PS is at low level, and is off wen the power save signal PS is at high level.

Though not shown in FIG. 2, the power IC 100 can further have integrated into it any circuit elements other than those mentioned above, such as a regulated voltage generator, a charge pump circuit, a brown-out circuit, a soft start circuit, an AC input compensation circuit, a frequency hopping circuit, and various protection circuits (such as a UVLO (undervoltage lock-out) circuit).

<On-Duty Control>

Next, the control of the on-duty of the transistor N1 will be described in brief. As mentioned above, when Vod>VoREF, the larger their difference, the more the driving current ILED increases and thus the feedback current Ifb increases. As the feedback current Ifb increases, the feedback voltage Vfb decreases and crosses the reference voltage Vref with earlier timing. Accordingly, the off-timing signal S6 rises with earlier timing, and the reset signal S10 rises with earlier timing. As a result, the PWM signal S11 (and hence the gate signal G1) falls with earlier timing; thus, the on-duty Don of the transistor N1 decreases, and the direct-current output voltage Vo lowers.

Reversely, when Vod<VoREF, the larger their difference, the more the driving current ILED decreases and thus the feedback current Ifb decreases. As the feedback current Ifb decreases, the feedback voltage Vfb increases and crosses the reference voltage Vref with later timing. Accordingly, the off-timing signal S6 rises with later timing, and the reset signal S10 rises with later timing. As a result, the PWM signal S11 (and hence the gate signal G1) falls with later timing; thus, the on-duty Don of the transistor N1 increases and the direct-current output voltage Vo rises.

Through the on-duty control described above, it is possible to keep the direct-current output voltage Vo at its target value (=[(R7+R8)/R8]×VoREF).

Of the circuit elements integrated into the power IC 100, the comparator 106, the controller 110, the RS flip-flop 111, the driver 112, the gain adjuster 113, the slope compensator 114, and the resistor 118 function as an on-duty controller that controls the on-duty Don of the transistor N1 based on the feedback current Ifb (the second output detection signal).

<Switching Operation Modes>

Next, the switching of the operation mode of the power IC 100 will be described. As mentioned above, the power IC 100 is equipped with a function of switching among a plurality of operating modes that vary in power consumption based on the light-load detection signal S2, the no-load detection signal S3, and the instant-return detection signal S4.

The following description deals with an example where the plurality of operating modes include, in addition to a regular mode (MODE 1), a light-load mode (MODE 2) and a no-load mode (MODE 3). Here, the light-load mode (MODE 2) is a first power-saving mode in which less electric power is consumed than in the regular mode (MODE 1), and the no-load mode (MODE 3) is a second power-saving mode in which still less electric power is consumed than in the light-load mode (MODE 2) (each mode will be described in detail later).

Figure 3:
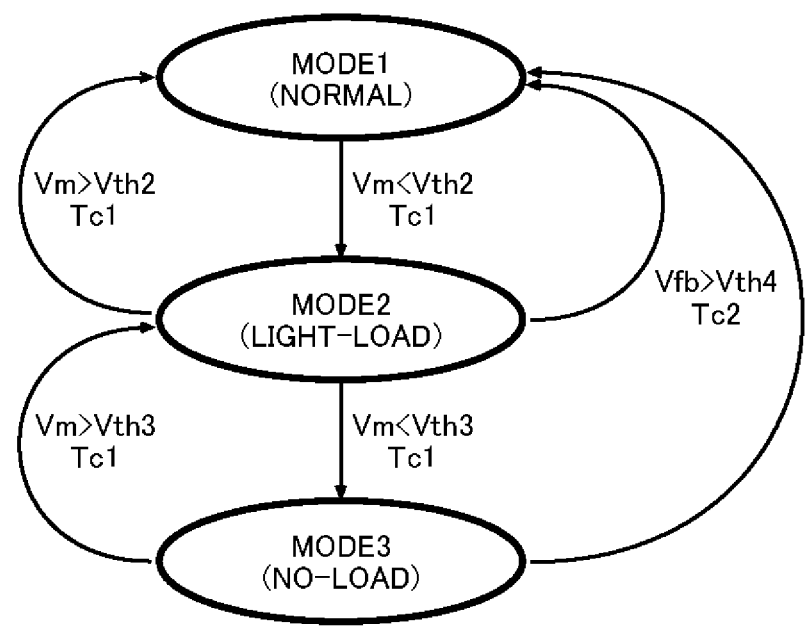
FIG. 3 is a diagram showing conditions for operating mode switching in a power IC.

FIG. 3 is a diagram showing the conditions that trigger the switching of operating modes in the power IC 100. While the power IC 100 is operating in the regular mode (MODE 1), if a state in which the monitor voltage Vm of the transistor N1 (more precisely, the monitor voltage Vm in the off-period of the transistor N1 this applies throughout the rest of the description) is lower than the threshold voltage Vth2, that is, a period in which no pulse edges are detected in the light-load detection signal S2, lasts for a check period Tc1, the power IC 100 shifts from the regular mode (MODE 1) to the light-load mode (MODE 2). Reversely, while the power IC 100 is operating in the light-load mode (MODE 2), if a state in which the monitor voltage Vm is higher than the threshold voltage Vth2, that is, a period in which pulse edges are periodically detected in the light-load detection signal S2, lasts for the check period Tc1, the power IC 100 returns from the light-load mode (MODE 2) to the regular mode (MODE 1).

On the other hand, while the power IC 100 is operating in the light-load mode (MODE 2), if a state in which the monitor voltage Vm is lower than the threshold voltage Vth3, that is, a period in which no pulse edges are detected in the no-load detection signal S3, lasts for the check period Tc1, the power IC 100 shifts from the light-load mode (MODE 2) to the no-load mode (MODE 3). Reversely, while the power IC 100 is operating in the no-load mode (MODE 3), if a state in which the monitor voltage Vm is higher than the threshold voltage Vth3, that is, a period in which pulse edges are periodically detected in the no-load detection signal S3, lasts for the check period Tc1, the power IC 100 returns from the no-load mode (MODE 3) to the light-load mode (MODE 2).

In this way, in accordance with the results of the monitoring of the monitor voltage Vm (that is, in accordance with the light-load detection signal S2 and the no-load detection signal S3), the controller 110 switches the operating mode of the power IC 100 between the regular mode (MODE 1) and the light-load mode (MODE 2) or between the light-load mode (MODE 2) and the no-load mode (MODE 3).

As mentioned above, the monitor voltage Vm in the off-period of the transistor N1 varies depending on the direct-current output voltage Vo. Accordingly, through the operating mode switching described above, for example, when the direct-current output voltage Vo is lowered in the secondary circuit system 1s, this can be detected to lower the power consumption by the power IC 100; it is thus possible to further reduce the standby power consumption in the entire electronic appliance X.

In the power IC 100, the monitor voltage Vm for overvoltage detection is used also for operating mode switching, and this eliminates the need to unnecessarily increase the number of external terminals.

Regardless of whether the power IC 100 is operating in the light-load mode (MODE 2) or in the no-load mode (MODE 3), if a state in which the feedback voltage Vfb is higher than the threshold voltage Vth4, that is, a state in which the instant-return detection signal S4 is at high level, lasts for a predetermined check period Tc2, the power IC 100 instantly returns to the regular mode (MODE 1).

In the present description, an "instant return" denotes a return, taking place regardless of the result of the monitoring of the monitor voltage Vm, to the regular mode (MODE 1) direct from the no-load mode (MODE 3) without entering the light-load mode (MODE 2), and covers not only an instant return to the regular mode (MODE 1) that takes place the instant the instant-return detection signal S4 rises to high level but also a return to the regular mode (MODE 1) that takes place after the lapse of the above-mentioned predetermined check period Tc2.

As described above, the controller 110 makes an instant return to the regular mode (MODE 1) according to the result of the monitoring of the feedback current Ifb (and hence the feedback voltage Vfb) (that is, according to the instant-return detection signal S4). Thus, when the target value of the direct-current output voltage Vo is raised in the secondary circuit system 1s, it is possible to make the power IC 100 return to the regular mode (MODE 1) without delay, thereby to increase the electric power supplied to the load 2; it is thus possible to raise the direct-current output voltage Vo without difficulty even under a heavy load 2.

Figure 4:
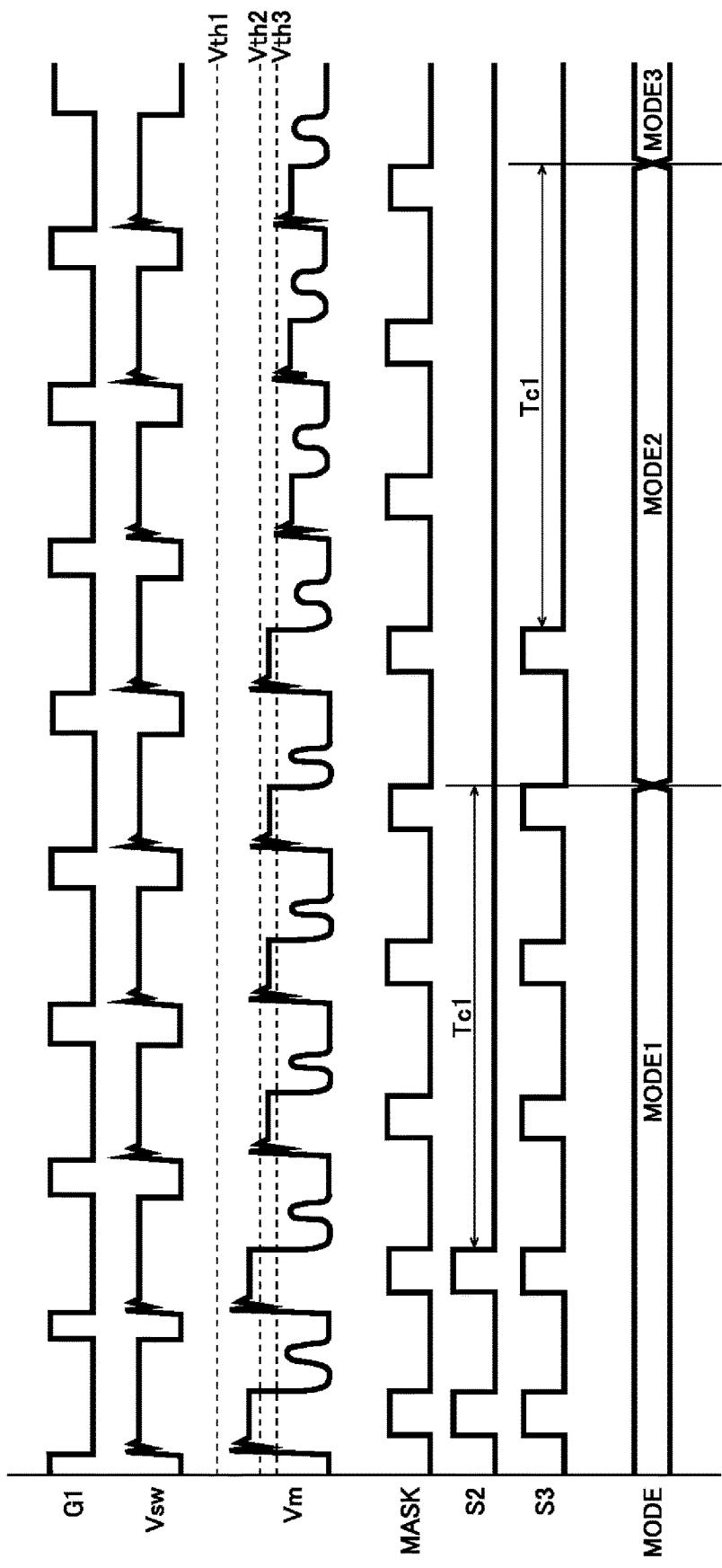
FIG. 4 is a timing chart showing one example of operating mode switching in a power IC.

FIG. 4 is a timing chart showing one example of operating mode switching in the power IC 100, depicting, from top down, the gate signal G1, a switching voltage Vsw (the drain voltage of the transistor N1), the monitor voltage Vm, a mask signal MASK (an internal signal of the controller 110), the light-load detection signal S2, the no-load detection signal S3, and the operating mode (MODE) of the power IC 100.

The mask signal MASK is a binary signal for applying masking (signal processing for extracting only the logic level during the off-period of the transistor N1) to each of the light-load detection signal S2 and the no-load detection signal S3. The mask signal MASK remains at high level (the logic level during the no-masking period) only for a predetermined monitoring period after the gate signal G1 is dropped to low level. Accordingly, FIG. 4 shows, as the light-load detection signal S2 and the no-load detection signal S3, not the output signals as they are of the comparators 102 and 103 but the signals having undergone the masking.

When, in the secondary circuit system 1s, the target value of the direct-current output voltage Vo is set at the regular value, then, during the off-period of the transistor N1 (during the period in which the gate signal G1 is at low level), Vm>Vth2. In this state, periodic pulses appear in each of the light-load detection signal S2 and in the no-load detection signal S3. While these pulses are being detected, the controller 110 keeps the power IC 100 in the regular mode (MODE 1).

When, in the secondary circuit system 1s, the target value of the direct-current output voltage Vo is lowered one step, then, in the off-period of the transistor N1, Vth3<Vm<Vth2. In this state, while periodic pulses appear in the no-load detection signal S3 as in the state described above, the light-load detection signal S2 stays pegged at low level. If this state lasts for the predetermined check period Tc1, the controller 110 shifts the power IC 100 from the regular mode (MODE 1) to the light-load mode (MODE 2).

When, in the secondary circuit system 1s, the target value of the direct-current output voltage Vo is lowered one more step, then, in the off-period of the transistor N1, Vm<Vth3.

In this state, not only the light-load detection signal S2 but also the no-load detection signal S3 stays pegged at low level. If this state lasts for the predetermined check period Tc1, the controller 110 shifts the power IC 100 from the light-load mode (MODE 2) to the no-load mode (MODE 3).

<Controller (First Configuration Examples)>

Figure 5:
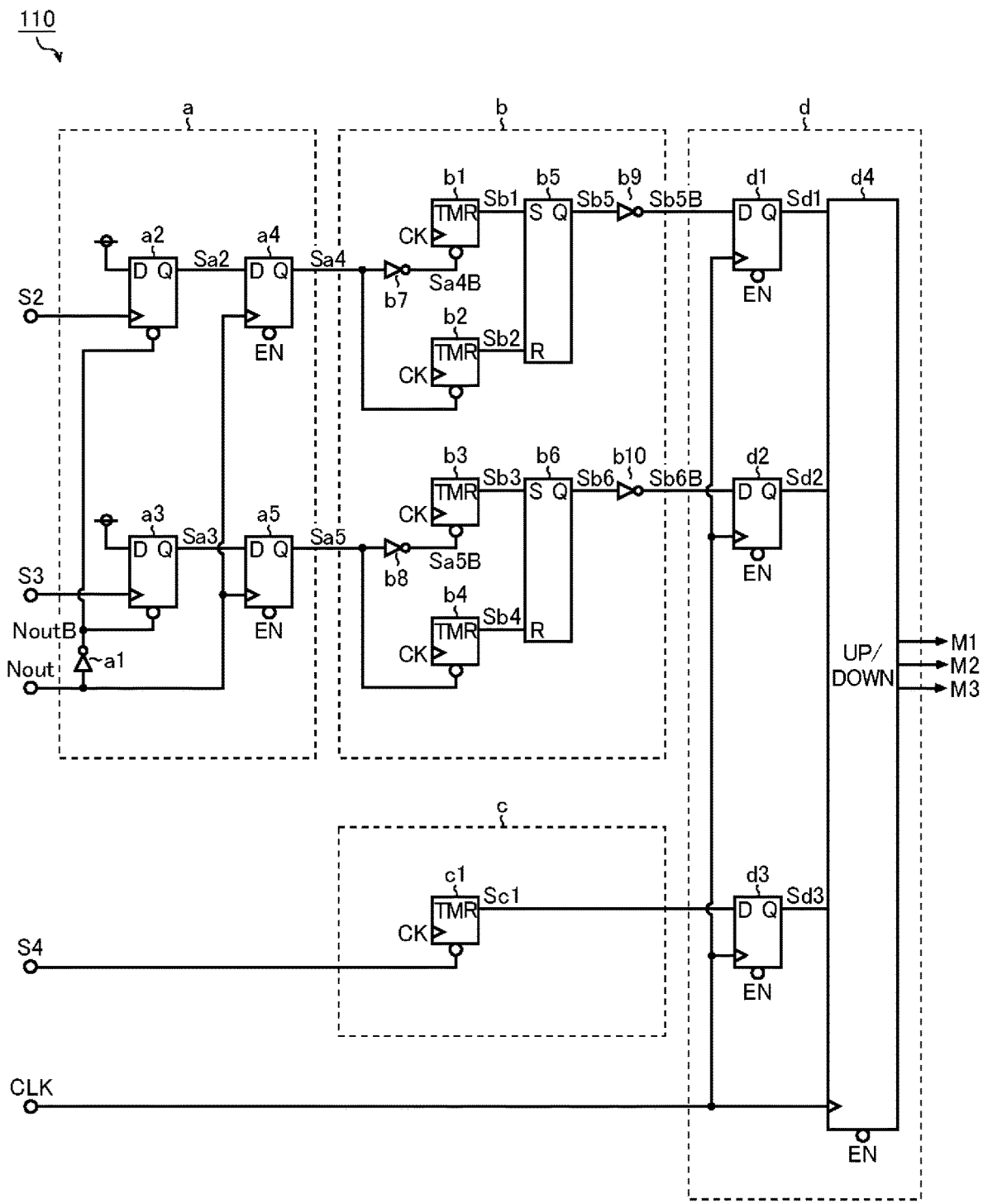
FIG. 5 is a diagram showing a first configuration example (of a part related to operating mode switching) of a controller.

FIG. 5 is a diagram showing a first configuration example of the controller 110. The controller 110 of this configuration example includes, as functional groups related to operating mode switching in the power IC 100, an edge detection block a, a first timer block b, a second timer block c, and an operating mode switch block d.

The edge detection block a is a circuit block that detects pulse edges in each of the light-load detection signal S2 and the no-load detection signal S3, and includes an inverter a1 and D flip-flops a2 to a5.

The inverter a1 inverts the logic level of an output state signal Nout to generate an inverted output state signal NoutB. Thus, the inverted output state signal NoutB is at low level when the output state signal Nout is at high level, and is at high level when the output state signal Nout is at low level. The output state signal Nout is a signal that indicates the on/off state of the transistor N1. For example, the output state signal Nout is at high level during the on-period of the transistor N1, and is at low level during the off-period of the transistor N1. The output state signal Nout can be generated, for example, by shifting the level of the gate signal G1.

The D flip-flop a2 receives, at its clock input terminal, the light-load detection signal S2, and when this rises to high level, the D flip-flop a2 latches a high-level signal fed to its data input terminal (D) to output, from its output terminal (Q), the latched result as an edge detection signal Sa2.

The D flip-flop a3 receives, at its clock input terminal, the no-load detection signal S3, and when this rises to high level, the D flip-flop a3 latches a high-level signal fed to its data input terminal (D) to output, from its output terminal (Q), the latched result as an edge detection signal Sa3.

The D flip-flops a2 and a3 are reset by the inverted output state signal NoutB, which is fed to their respective reset input terminals. Specifically, the flip-flops a2 and a3 are in a reset state (Sa2=Sa3=L (low level)) during the low-level period of the inverted output state signal NoutB (that is, the on-period of the transistor N1), and are in a reset-release state during the high-level period of the inverted output state signal NoutB (that is, the off-period of the transistor N1).

The D flip-flop a4 receives, at its clock input terminal, the output state signal Nout, and when this rises to high level, the D flip-flop a4 latches the edge detection signal Sa2, which is fed to its data input terminal (D), to output, from its output terminal (Q), the latched result as an edge detection signal Sa4.

The D flip-flop a5 receives, at its clock input terminal, the output state signal Nout, and when this rises to high level, the D flip-flop a5 latches the edge detection signal Sa3, which is fed to its data input terminal (D), to output, from its output terminal (Q), the latched result as an edge detection signal Sa5.

The D flip-flops a4 and a5 are reset by an enable signal EN, which is fed to their respective reset input terminals. Specifically, the flip-flops a4 and a5 are in a reset state (Sa4=Sa5=L (low level)) during the low-level period of the enable signal EN (that is, the disabled period of the power IC 100), and are in a reset-release state during the high-level period of the enable signal EN (that is, the enabled period of the power IC 100).

The first timer block b is a circuit block that counts the predetermined check period Tc1, and includes timers b1 to b4, RS flip-flops b5 and b6, and inverters b7 to b10.

The timer b1 is for determining whether or not to shift from the regular mode (MODE 1) to the light-load mode (MODE 2). The timer b1 counts the number of pulses in clock pulses CK fed to its clock input terminal, and when the count value reaches a predetermined value (corresponding to the check period Tc1), the timer b1 raises a set signal Sb1 to high level. Here, the timer b1 is reset by an inverted edge detection signal Sa4B fed to its reset input terminal. More specifically, the timer b1 is in a reset state during the low-level period of the inverted edge detection signal Sa4B (that is, in the period in which pulse edges are periodically detected in the light-load detection signal S2), and is in a reset-release state during the high-level period of the inverted edge detection signal Sa4B (that is, in the period in which no pulse edges are detected in the light-load detection signal S2). Thus, the set signal Sb1 rises to high level when the inverted edge detection signal Sa4B is kept at high level for the check period Tc1.

The timer b2 is for determining whether or not to shift from the light-load mode (MODE 2) to the regular mode (MODE 1). The timer b2 counts the number of pulses in the clock pulses CK fed to its clock input terminal, and when the count value reaches a predetermined value (corresponding to the check period Te1), the timer b2 raises a reset signal Sb2 to high level. Here, the timer b2 is reset by the edge detection signal Sa4 fed to its reset input terminal. Specifically, the timer b2 is in a reset state during the low-level period of the edge detection signal Sa4 (that is, in the period in which no pulse edges are detected in the light-load detection signal S2), and is in a reset-release state during the high-level period of the edge detection signal Sa4 (that is, in the period in which pulse edges are periodically detected in the light-load detection signal S2). Thus, the reset signal Sb2 rises to high level when the edge detection signal Sa4 is kept at high level for the check period Tc1.

The timer b3 is for determining whether or not to shift from the light-load mode (MODE 2) to the no-load mode (MODE 3). The timer b3 counts the number of pulses in the clock pulses CK fed to its clock input terminal, and when the count value reaches a predetermined value (corresponding to the check period Tc1), the timer b3 raises a set signal Sb3 to high level. Here, the timer b3 is reset by an inverted edge detection signal Sa5B fed to its reset input terminal. More specifically, the timer b3 is in a reset state during the low-level period of the inverted edge detection signal Sa5B (that is, in the period in which pulse edges are periodically detected in the light-load detection signal S3), and is in a reset-release state during the high-level period of the inverted edge detection signal Sa5B (that is, in the period in which no pulse edges are detected in the light-load detection signal S3). Thus, the set signal Sb3 rises to high level when the inverted edge detection signal Sa5B is kept at high level for the check period Tc1.

The timer b4 is for determining whether or not to shift from the no-load mode (MODE 3) to the light-load mode (MODE 2). The timer b4 counts the number of pulses in the clock pulses CK fed to its clock input terminal, and when the count value reaches a predetermined value (corresponding to the check period Te1), the timer b4 raises a reset signal Sb4 to high level. Here, the timer b4 is reset by the edge detection signal Sa5 fed to its reset input terminal. More specifically, the timer b4 is in a reset state during the low-level period of the edge detection signal Sa5 (that is, in the period in which no pulse edges are detected in the light-load detection signal S3), and is in a reset-release state during the high-level period of the edge detection signal Sa5 (that is, in the period in which pulse edges are periodically detected in the light-load detection signal S3). Thus, the reset signal Sb4 rises to high level when the edge detection signal Sa5 is kept at high level for the check period Tc1.

The RS flip-flop b5 receives the set signal Sb1 at its set terminal (S) and the reset signal Sb2 at its reset terminal (R), and according to these signals, the RS flip-flop b5 switches the logic level of a shift/return signal Sb5 that it outputs from its output terminal (Q). Specifically, when the set signal Sb1 rises to high level, the RS flip-flop b5 sets the shift/return signal Sb5 to high level; when the reset signal Sb2 rises to high level, the RS flip-flop b5 resets the shift/return signal Sb5 to low level. That is, the shift/return signal Sb5 rises to high level when timing for a shift from the regular mode (MODE 1) to the light-load mode (MODE 2) arrives, and falls to low level when timing for a shift from the light-load mode (MODE 2) to the regular mode (MODE 1) arrives.

The RS flip-flop b6 receives the set signal Sb3 at its set terminal (S) and the reset signal Sb4 at its reset terminal (R), and according to these signals, the RS flip-flop b6 switches the logic level of a shift/return signal Sb6 that it outputs from its output terminal (Q). Specifically, when the set signal Sb3 rises to high level, the RS flip-flop b6 sets the shift/return signal Sb6 to high level; when the reset signal Sb4 rises to high level, the RS flip-flop b6 resets the shift/return signal Sb6 to low level. That is, the shift/return signal Sb6 rises to high level when timing for a shift from the light-load mode (MODE 2) to the no-load mode (MODE 3) arrives, and falls to low level when timing for a shift from the no-load mode (MODE 3) to the light-load mode (MODE 2) arrives.

The inverter b7 logically inverts the edge detection signal Sa4 to generate the inverted edge detection signal Sa4B. Thus, the inverted edge detection signal Sa4B is at low level when the edge detection signal Sa4 is at high level, and is at high level when the edge detection signal Sa4 is at low level.

The inverter b8 logically inverts the edge detection signal Sa5 to generate the inverted edge detection signal Sa5B. Thus, the inverted edge detection signal Sa5B is at low level when the edge detection signal Sa5 is at high level, and is at high level when the edge detection signal Sa5 is at low level.

The inverter b9 logically inverts the shift/return signal Sb5 to generate the inverted shift/return signal Sb5B. Thus, the inverted edge detection signal Sb5B is at low level when the shift/return signal Sb5 is at high level, and is at high level when the shift/return signal Sb5 is at low level.

The inverter b10 logically inverts the shift/return signal Sb6 to generate the inverted shift/return signal Sb6B. Thus, the inverted edge detection signal Sa6B is at low level when the shift/return signal Sb6 is at high level, and is at high level when the shift/return signal Sb6 is at low level.

The second timer block c is a circuit block that counts the predetermined check period Tc2, and includes a timer c1.

The timer c1 is for determining whether or not to perform an instant return from the light-load mode (MODE 2) or the no-load mode (MODE 3) to the regular mode (MODE 1). The timer c1 counts the number of pulses in the clock pulses CK fed to its clock input terminal, and when the count value reaches a predetermined value (corresponding to the check period Tc2), the timer c1 raises an instant return signal Sc1 to high level. Here, the timer c1 is reset by the instant-return detection signal S4, which is fed to its reset input terminal. Specifically, the timer c1 is in a reset state during the low-level period of the instant-return detection signal S4 (that is, during the period in which the feedback voltage Vfb is lower than the threshold voltage Vth4), and is in a reset-release state during the high-level period of the instant-return detection signal S4 (that is, during the period in which the feedback voltage Vfb is higher than the threshold voltage Vth4). Thus, the instant return signal Sc1 rises to high level when the instant-return detection signal S4 is kept at high level for the check period Tc2.

Although FIG. 5 shows a configuration example where pulse counters (digital timers) are used as the timers b1 to b4 and c1, analog timers may instead be used.

The operating mode switch block d is a circuit block that generates mode signals M1 to M3 based on the inverted edge detection signals Sa5B and Sb6B and the instant return signal Sc1, and includes D flip-flops d1 to d3 and an up/down counter d4.

The D flip-flop d1 receives, at its clock input terminal, the drive clock signal CLK, and when this rises to high level, the D flip-flop d1 latches the inverted shift/return signal Sb5B, which is fed to its data input terminal (D), to output, from its output terminal (Q), the latched result as an up/down signal Sd1.

The D flip-flop d2 receives, at its clock input terminal, the drive clock signal CLK, and when this rises to high level, the D flip-flop d2 latches the inverted shift/return signal Sb6B, which is fed to its data input terminal (D), to output, from its output terminal (Q), the latched result as an up/down signal Sd2.

The D flip-flop d3 receives, at its clock input terminal, the drive clock signal CLK, and when this rises to high level, the D flip-flop d3 latches the instant return signal Sc1, which is fed to its data input terminal (D), to output, from its output terminal (Q), the latched result as a reset signal Sd3.

The D flip-flops d1 to d3 are reset by the enable signal EN, which is fed to their respective reset input terminals. More specifically, the D flip-flops d1 to d3 are in a reset state (Sd1=Sd2=Sd3=L (low level)) during the low-level period of the enable signal EN (that is, the disabled period of the power IC 100), and is in a reset-release state during the high-level period of the enable signal EN (that is, the enabled period of the power IC 100).

The up/down counter d4 switches the logic levels of the mode signals M1 to M3 as rising and falling edges occur in the up/down signals Sd1 and Sd2.

The following description assumes that the mode signal M1 is at high level when the power IC 100 is in the regular mode (MODE 1) and is at low level in any other operating mode, that the mode signals M2 is at high level when the power IC 100 is in the light-load mode (MODE 2) and is at low level in any other operating mode, and that the mode signals M3 is at high level when the power IC 100 is in the no-load mode (MODE 3) and is at low level in any other operating mode.

That is, the mode signals M1 to M3 can be grasped as three-bit signals "M1M2M3", and then the output value of the up/down counter d4 can be one of the three values "100b", "010b", and "001b", which correspond to the regular mode (MODE 1), the light-load mode (MODE 2), and the no-load mode (MODE 3) respectively.

For example, when the output value of the up/down counter d4 is "100b", if no pulse edges are detected in the light-load detection signal S2 for the check period Te1 and then the up/down signal Sd1 falls to low level, the output value of the up/down counter d4 is counted down to "010b". This counting-down causes the operating mode of the power IC 100 to shift from the regular mode (MODE 1) to the light-load mode (MODE 2).

On the other hand, when the output value of the up/down counter d4 is "010b", if pulse edges are periodically detected in the light-load detection signal S2 for the check period Tc1 and then the up/down signal Sd1 rises to high level, the output value of the up/down counter d4 is counted up to "100b". This counting-up causes the operating mode of the power IC 100 to return from the light-load mode (MODE 2) to the regular mode (MODE 1).

For another example, when the output value of the up/down counter d4 is "010", if no pulse edges are detected in the no-load detection signal S3 for the check period Tc1 and then the up/down signal Sd2 falls to low level, the output value of the up/down counter d4 is counted down to "001b". This counting-down causes the operating mode of the power IC 100 to shift from the light-load mode (MODE 2) to the no-load mode (MODE 3).

On the other hand, when the output value of the up/down counter d4 is "001b", if pulse edges are periodically detected in the no-load detection signal S3 for the check period Te1 and then the up/down signal Sd2 rises to high level, the output value of the up/down counter d4 is counted up to "010b". This counting-up causes the operating mode of the power IC 100 to return from the no-load mode (MODE 3) to the light-load mode (MODE 2).

The up/down counter d4 is reset by the reset signal Sd3, which is fed to it from the D flip-flop d3. More specifically, when the output value of the up/down counter d4 is "010b" or "001b", if the feedback voltage Vfb remains higher than the threshold voltage Vth4 for the check period Tc2 and then the reset signal Sd3 rises to high level, the output value of the up/down counter d4 is reset to "100b". This resetting causes the operating mode of the power IC 100 to return instantly from the light-load mode (MODE 2) or the no-load mode (MODE 3) to the regular mode (MODE 1).

The up/down counter d4 is reset also by the enable signal EN, which is fed to its reset input terminal. More specifically, the up/down counter d4 is in a reset state during the low-level period of the enable signal EN (that is, the disabled period of the power IC 100), and is in a reset-release state during the high-level period of the enable signal EN (that is, the enabled period of the power IC 100).

<Light-Load Mode>

Figure 6:
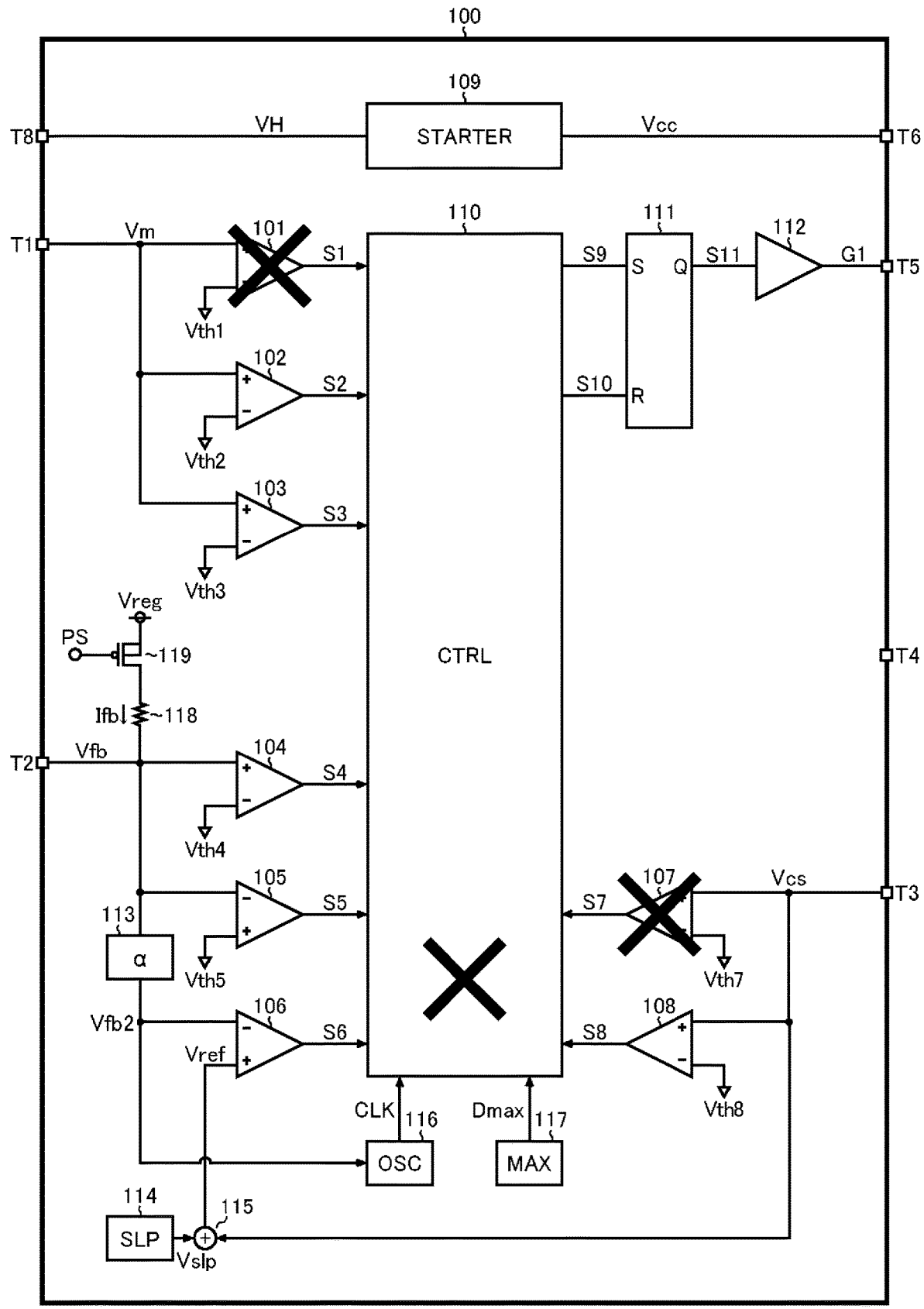
FIG. 6 is a diagram showing an internal operating state of a power IC in a light-load mode.

FIG. 6 is a diagram showing an internal operating state of the power IC 100 in the light-load mode (MODE 2). As indicated by cross marks in the diagram, in the light-load mode (MODE 2), the operation of the comparators 101 and 107 and of part of the controller 110 (specifically, the functional blocks related to the signal processing of the overvoltage detection signal S1 and the overload detection signal S7) is suspended, so that their current consumption is reduced.

Figure 7:
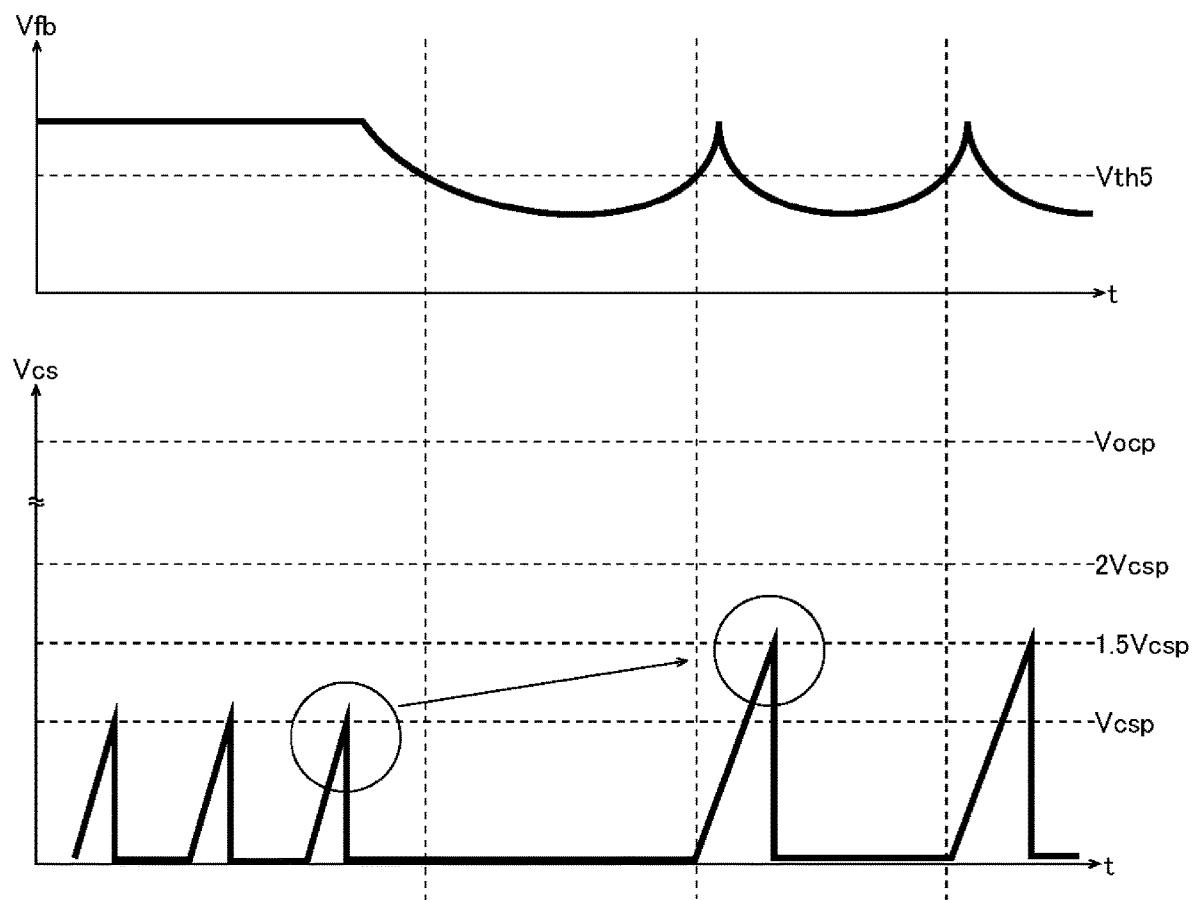
FIG. 7 is a timing chart showing one example of peak current control in a light-load mode.

FIG. 7 is a timing chart showing one example of peak current control in the light-load mode (MODE 2). In the upper tier is shown the feedback voltage Vfb, and in the lower tier is shown the sense voltage Vcs.

As shown in FIG. 7, in the light-load mode (MODE 2), the peak current value of the primary current Ip passing in the transistor N1 (corresponding to the peak value Vcsp of the sense voltage Vcs) is raised to, for example, 1.5 times that in the regular mode (MODE 1).

With this peak current control, simply turning on the transistor N1 once permits a higher primary current Ip to pass. Accordingly, in a case as shown in FIG. 7 where the feedback voltage Vfb is lower than the threshold voltage Vth5 and burst control of the transistor N1 is being performed, it is possible to reduce the number of times of switching required at burst termination, and thus to reduce the switching loss.

As described above, in the light-load mode (MODE 2), compared to the regular mode (MODE 1), the current consumption by the power IC 100 is reduced, and the peak current value at burst termination is raised; thus, lower standby power consumption is achieved in the power IC 100.

<No-Load Mode>

Figure 8:
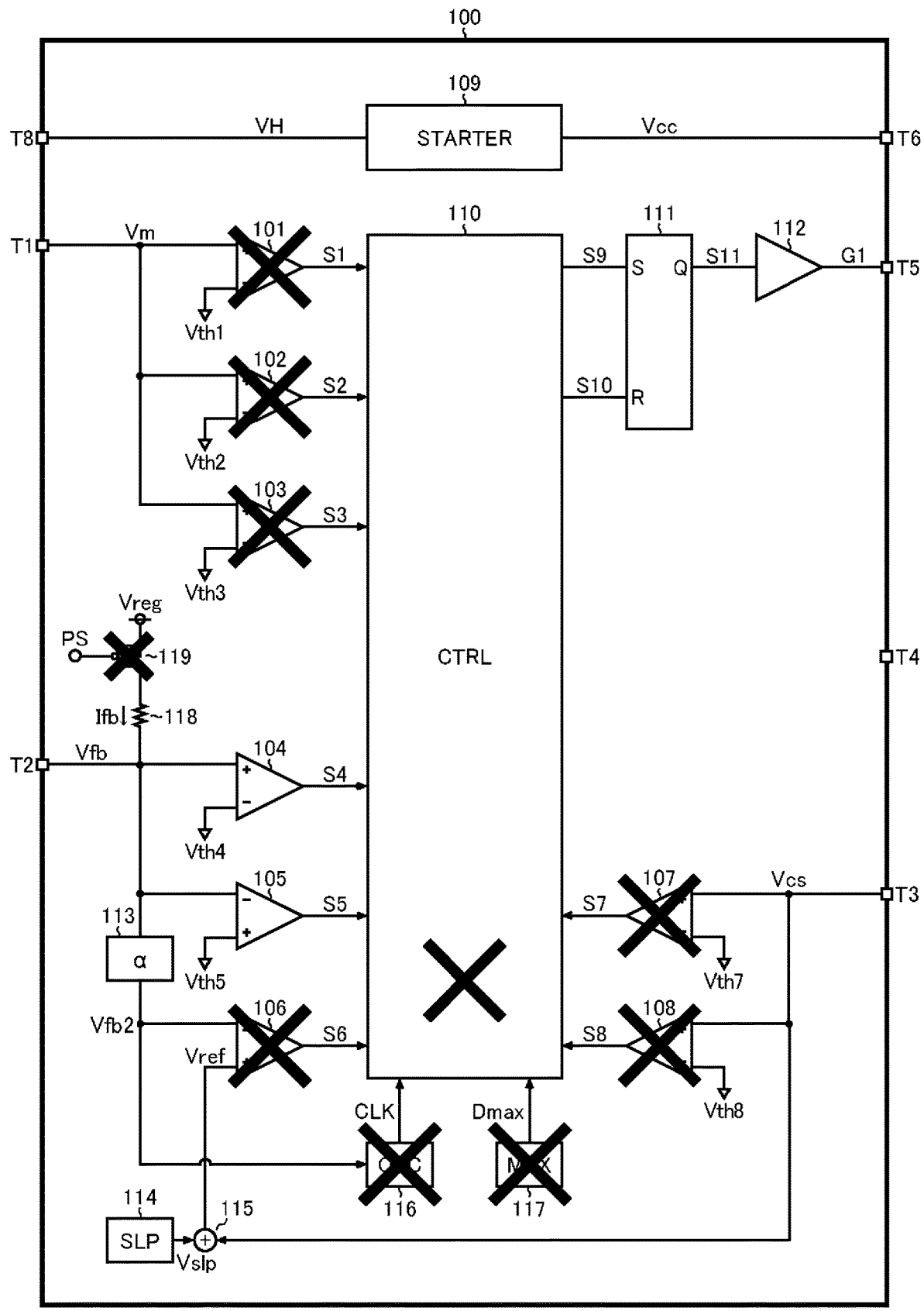
FIG. 8 is a diagram showing an internal operating state of a power IC in a no-load mode.

FIG. 8 is a diagram showing an internal operating state of the power IC 100 in the no-load mode (MODE 3). As indicated by cross marks in the diagram, in the no-load mode (MODE 3), current consumption reduction similar to that in the light-load mode (MODE 2) is performed, and in addition, during the burst stop period of the transistor N1, the operation of the comparators 101 to 103 and 106 to 108, the oscillator 116, the maximum duty setter 117, and almost all blocks of the controller 110 (other than the functional blocks related to the signal processing of the instant-return detection signal S4 and the burst detection signal S5) is suspended, so that their current consumption is reduced.

Moreover, in the no-load mode (MODE 3), during the burst stop period of the transistor N1, the transistor 119 is kept off. Thus, the current path of the feedback current Ifb is cut off, and accordingly the current consumption by the power IC 100 is greatly reduced.

Figure 9:
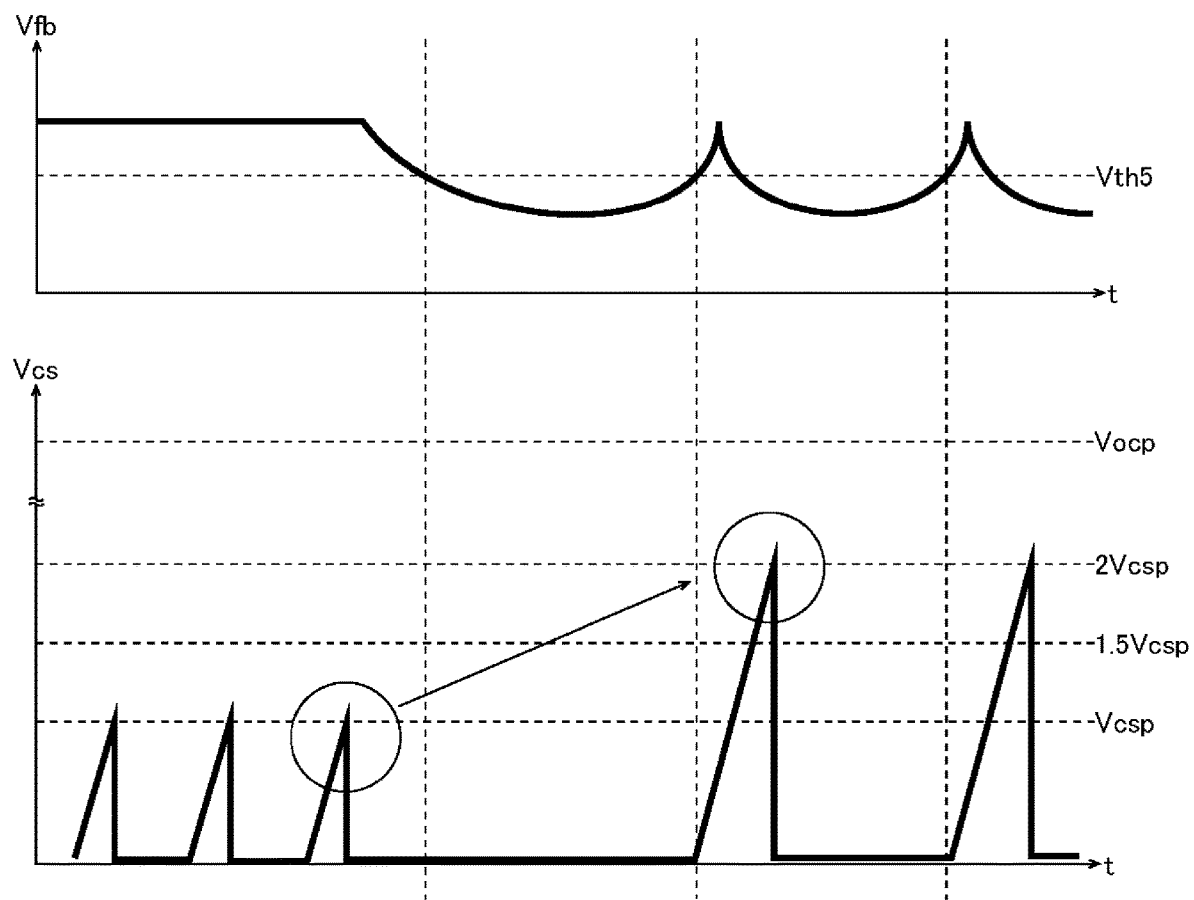
FIG. 9 is a timing chart showing one example of peak current control in a no-load mode.

FIG. 9 is a timing chart showing one example of peak current control in the no-load mode (MODE 3). As in FIG. 7 referred to above. In the upper tier is shown the feedback voltage Vfb, and in the lower tier is shown the sense voltage Vcs.

As shown in FIG. 9, in the no-load mode (MODE 3), the peak current value of the primary current Ip passing in the transistor N1 (corresponding to the peak value Vcsp of the sense voltage Vcs) is raised to, for example, twice that in the regular mode (MODE 1). It is thus possible to further reduce the number of times of switching required at burst termination, and thus to further reduce the switching loss.

Here, settings are so made that, even when the peak current value of the primary current Ip is raised to twice, the peak value of the sense voltage Vcs (that is, 2Vcsp) is sufficiently lower than an overcurrent detection value Vocp. Thus, in the no-load mode (MODE 3), unintended overcurrent protection is never invoked.

Moreover, in the no-load mode (MODE 3), control is so performed that the burst stop period remains equal to or longer than a predetermined value (for example 10 ms) (details will be given later).

As described above, in the no-load mode (MODE 3), control is so performed that the burst stop period remains equal to or longer than a predetermined value; in addition, compared to the light-load mode (MODE 2), the current consumption during the burst stop period is reduced and the peak current value at burst termination is further raised. Thus, still lower standby power consumption is achieved in the power IC 100.

<Controller (Second Configuration Example)>

Figure 10:
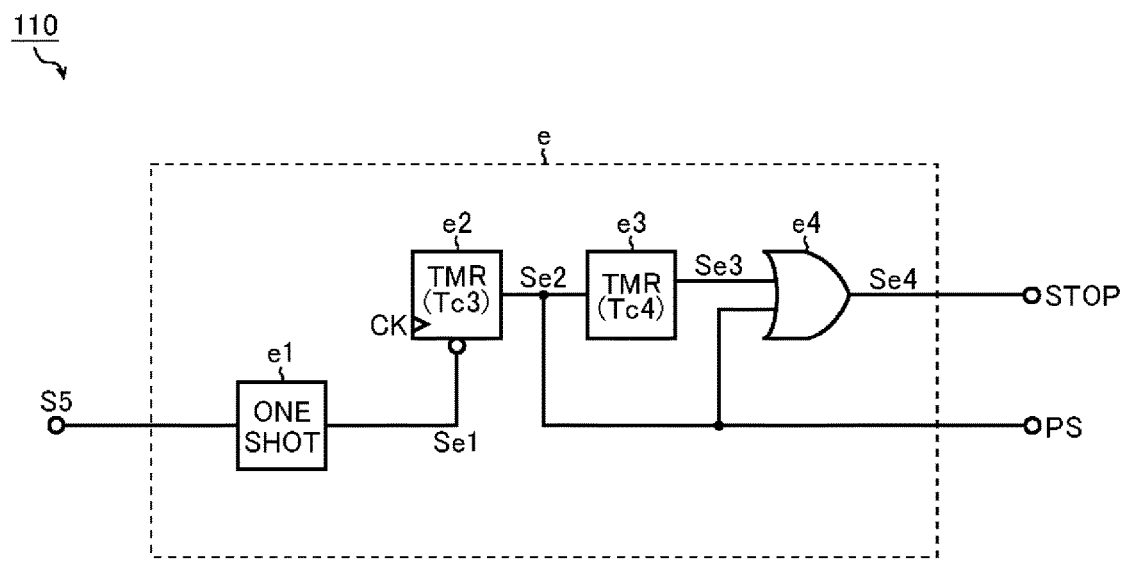
FIG. 10 is a diagram showing a second configuration example (of a part related to burst control) of a controller.

FIG. 10 is a diagram showing a second configuration example of the controller 110. The controller 110 of this configuration example includes, as a functional block related to burst control in the no-load mode (MODE 3), a burst control block e.

The burst control block e is a circuit block that generates a burst stop signal STOP and a power save signal PS such that, in the no-load mode (MODE 3), the burst stop period remains equal to or longer than a predetermined value (for example 10 ms). The burst control block e includes a one-shot pulse generator e1, timers e2 and e3, and an OR gate e4.

The one-shot pulse generator e1 generates a one-shot pulse in a reset signal Se1 when the burst detection signal S5 rises to high level.

The timer e2 is for counting a burst stop period Tc3 (for example, 10 ms). The timer e2 counts the number of pulses in the clock pulses CK fed to its clock input terminal, and when the count value reaches a predetermined value (corresponding to the burst stop period Tc3), the timer e2 drops a timer signal Se2 from high level to low level. The timer e2 is reset by a one-shot pulse in the reset signal Se1 fed to its reset input terminal. Accordingly, the timer signal Se2 rises to high level when the burst detection signal S5 rises to high level, and falls to low level when the burst stop period Tc3 expires. The timer signal Se2 is fed not only to the timer e3 but also, as the power save signal PS, to different parts in the power IC 100.

The timer e3 is for generating a circuit recovery time Tc4 (for example, 150 μs), and its simplest circuit configuration uses a delay timer that delays the timer signal Se2 by the circuit recovery time Tc4 to generate a delayed timer signal Se3. The circuit recovery time Tc4 is a standby time required after the supply of currents to different parts of the power IC 100 is restarted until their operation stabilizes.

The OR gate e4 generates an OR signal Se4 between the timer signal Se2 and the delayed timer signal Se3. Accordingly, the OR signal Se4 is at high level when at least one of the timer signal Se2 and the delayed timer signal Se3 is at high level, and is at low level when the timer signal Se2 and the delayed timer signal Se3 are both at low level. The OR signal Se4 is used as the burst stop signal STOP.

<Burst Control>

Figure 11:
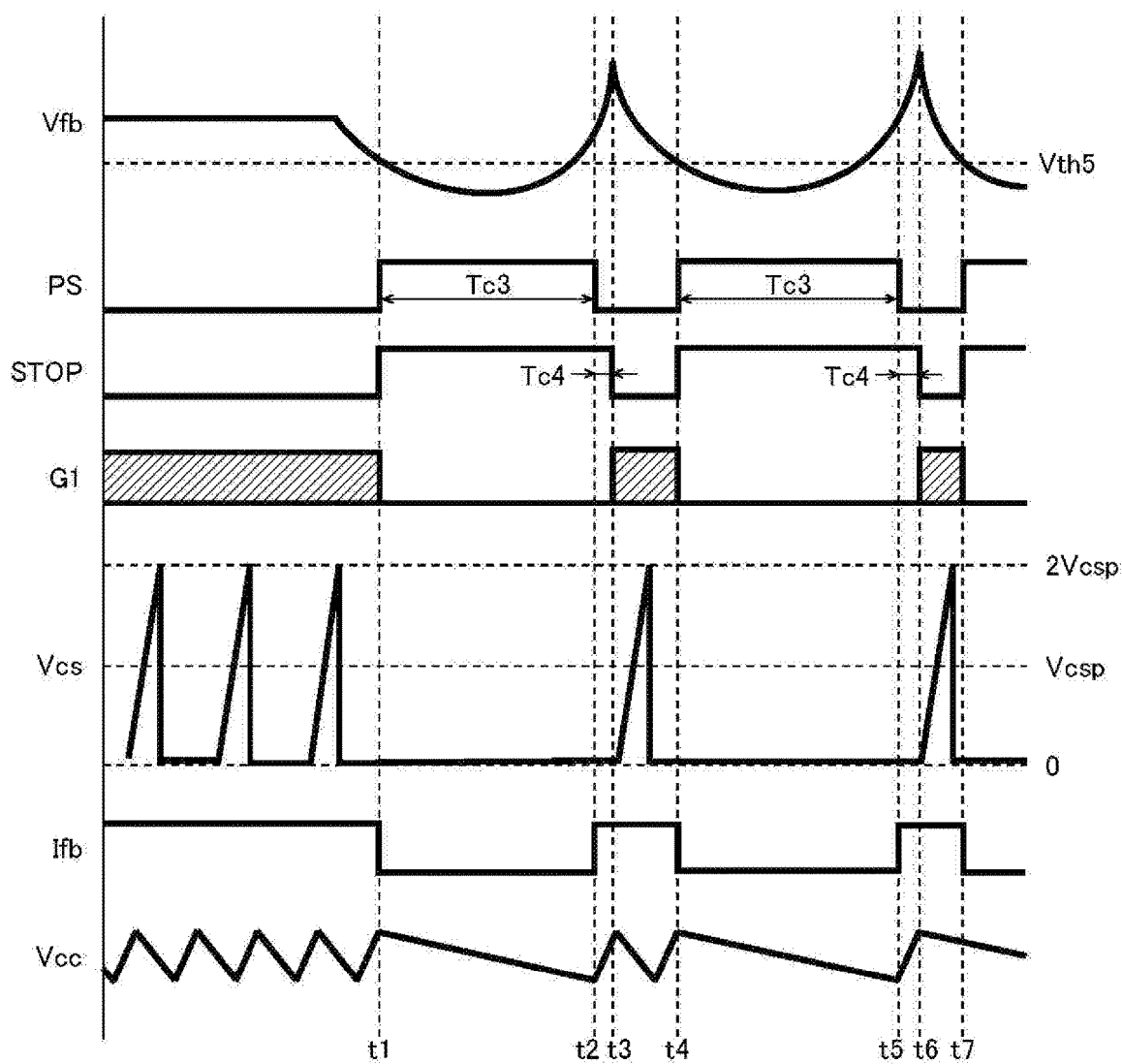
FIG. 11 is a timing chart showing one example of burst control in a no-load mode.

FIG. 11 is a timing chart showing one example of burst control in the no-load mode (MODE 3), depicting, from top down, the feedback voltage Vfb, the power save signal PS, the burst stop signal STOP, the gate signal G1, the sense voltage Vcs, the feedback current Ifb, and the supply voltage Vcc.

When, at time point t1, the feedback voltage Vfb falls below the threshold voltage Vth5, the power save signal PS and the burst stop signal STOP rise to high level. As a result, the gate signal G1 is held at low level, so that the switching of the transistor N1 is stopped and the feedback current Ifb is shut off.

At the lapse of the burst stop period Tc3 from time point t1, that is, at time point t2, the power save signal PS falls to low level. As a result, the feedback current Ifb starts to pass. In FIG. 11, before the lapse of the burst stop period Tc3 from time point t1, the feedback voltage Vfb rises above the threshold voltage Vth5, at which time point, however, the power save signal PS is never dropped to low level in the no-load mode (MODE 3).

At the lapse of the circuit recovery time Tc4 from time point t2, that is, at time point t3, the burst stop signal STOP falls to low level. As a result, the gate signal G1 is released from being held at low level, and the switching of the transistor N1 is restarted.

Thereafter, at time point t4, when the feedback voltage Vfb falls below the threshold voltage Vth5 again, burst control similar to that described above is repeated.

As described above, in burst control in the no-load mode (MODE 3), during the burst stop period (see time points t1 to t3 etc.), not only is the switching of the transistor N1 stopped, but also the feedback current Ifb passing in the phototransistor PT is cut off. This helps greatly reduce the standby power consumption of the power IC 100 (that is, the sum of the electric power consumed by the switching operation of the n1 and the electric power consumed by the operation of the power IC 100 itself).

In particular, when the direct-current output voltage Vo is lowered in the secondary circuit system 1*s*, the supply voltage Vcc, which is generated from the induced voltage Vp in the auxiliary winding L3, also lowers. Accordingly, in the power IC 100, the capacitor C2 starts to be re-charged by the starter 109. Even then, with burst control in the no-load mode (MODE 3), it is possible to greatly reduce the power consumption by the power IC 100 and minimize the frequency of the just-mentioned re-charging, and it is thus possible to save the standby power consumption from deteriorating.

From FIG. 11, it is understood that, during the period in which the feedback current Ifb is cut off (see time points t1 to t2 etc.), the supply voltage Vcc falls gently and this reduces the frequency of the re-charging by the starter 109.

<Gain Adjuster>

Figure 12:
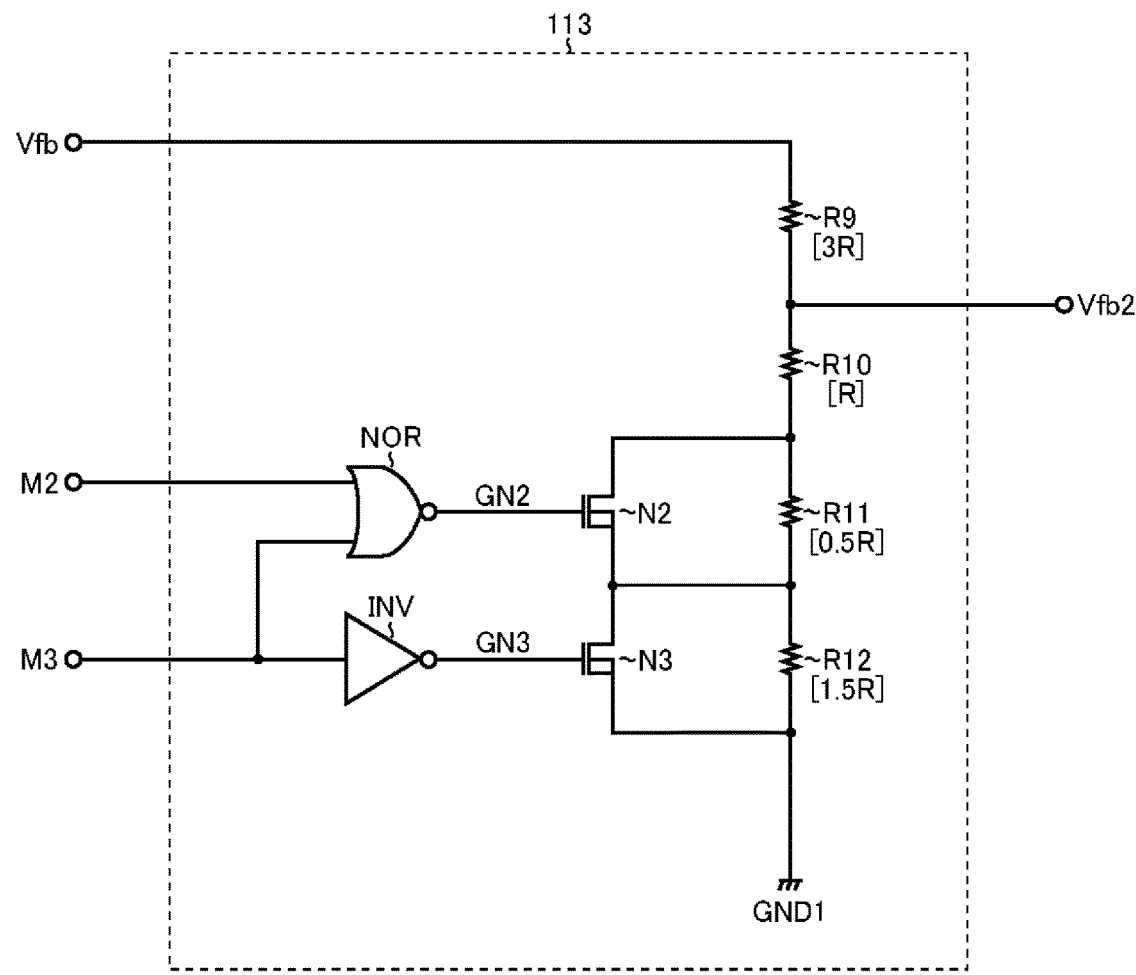
FIG. 12 is a diagram showing one configuration example of a gain adjuster.

FIG. 12 is a diagram showing one configuration example of the gain adjuster 113. The gain adjuster 113 of this configuration example is a circuit block that functions as a peak current switch that switches, between a plurality of operating modes, the peak current value of the primary current Ip passing in the transistor N1. The gain adjuster 113 includes resistors R9 to R12, N-channel MOS field-effect transistors N2 and N3, a NOR gate NOR, and an inverter INV.

In the following description, it is assumed that the resistor R9 has a resistance value 3R, that the resistor R10 has a resistance value R, that the resistor R11 has a resistance value 0.5R, and the resistor R12 has a resistance value 1.5R.

The first terminal of the resistor R9 is connected to a terminal to which the feedback voltage Vfb is fed (that is, the external terminal T2). The second terminal of the resistor R9 and the first terminal of the resistor R10 are connected to a terminal from which the divided feedback signal Vfb2 is output. The second terminal of the resistor R10 and the first terminal of the resistor R11 are connected to the drain of the transistor N2. The first terminal of the resistor R11 and the second terminal of the resistor R12 are both connected to the source and the backgate of the transistor N2 and also to the drain of the transistor N3. The second terminal of the resistor R12 is connected to the source and the backgate of the transistor N2 and also to the ground terminal GND1.

The gate of the transistor N2 is connected to the output terminal of the NOR gate NOR (corresponding to a terminal from which a gate signal GN2 is output). Accordingly, the transistor N2 is on when the gate signal GN2 is at high level, and is off when the gate signal GN2 is at low level.

The gate of the transistor N3 is connected to the output terminal of the inverter INV (corresponding to a terminal from which a gate signal GN3 is output). Accordingly, the transistor N3 is on when the gate signal GN3 is at high level, and is off when the gate signal GN3 is at low level.

The NOR gate NOR generates a NOR signal between the mode signals M2 and M3, and outputs it as the gate signal GN2. Accordingly, the gate signal GN2 is at low level when at least one of the mode signals M2 and M3 is at high level, and is at high level when the mode signals M2 and M3 are both at low level.

The inverter INV generates a logical inversion signal of the mode signals M3, and outputs it as the gate signal GN3. Accordingly, the gate signal GN3 is at low level when the mode signals M3 is at high level, and is at high level when the mode signals M3 is at low level.

In the gain adjuster 113 configured as described above, when the power IC 100 is in the regular mode (MODE 1), M2=M3=L and GN2=GN3=H; hence N2=N3=ON; accordingly, the gain α equals ¼ (=R/(3R+R)).

When the power IC 100 is in the light-load mode (MODE 2), M2=H, M3=L, GN2=L, and GN3=H; hence N2=OFF and N3=ON; accordingly, the gain α equals ⅓ (=(R+0.5R)/(3R+R+0.5R)).

When the power IC 100 is in the no-load mode (MODE 3), M2=L, M3=H, and GN2=GN3=L; hence, N2=N3=OFF; thus, the gain α equals ½ (=(R+0.5R+1.5R)/(3R+R+0.5R+1.5R)).

From formula (1) below, it is seen that switching the gain α results in switching the peak current value of the primary current Ip.

$$Ip=Vcs/Rs=\alpha \times Vfb/Rs \qquad (1)$$

That is, in the light-load mode (MODE 2), by switching such that α=⅓, it is possible to increase the peak current value of the primary current Ip to 1.33 times that in the regular mode (MODE 1, where α=¼), and thereby to achieve improved efficiency under a light load.

On the other hand, in the no-load mode (MODE 3), by switching such that α=½, it is possible to increase the peak current value of the primary current Ip to twice that in the regular mode (MODE 1, where α=¼), and thereby to achieve improved efficiency under no load.

<Switching the Peak Current>

Although the description thus far deals with, as an example, a configuration where the peak current value of the primary current Ip is switched between different operating modes of the power IC 100, peak current switching (gain adjustment) does not necessarily have to be performed in coordination with mode switching. By raising the peak current value of the primary current Ip on detection of a light load, it is possible to achieve higher efficiency under a light load (in a standby state).

A light load can be detected as follows. For example, when the feedback voltage Vfb falls below the threshold voltage Vth5, the burst detection signal S5 rises to high level, and the controller 110 starts burst control of the transistor N1; this can be detected as a light load, and the peak current value of the primary current Ip can then be raised.

For another example, after the power IC 100 starts burst control of the transistor N1, when the burst stop period of the transistor N1 (the period in which the feedback voltage Vfb is lower than the threshold voltage Vth5) becomes longer than a predetermined value, this can be detected as a light load so that the peak current value of the primary current Ip can then be raised.

For yet another example, a drop in the peak voltage value of the sense voltage Vcs, a shortening of the on-period of the transistor N1, or the like can be detected so that the peak current value of the primary current Ip can then be raised.

On the other hand, the peak current value can be switched as described previously; that is, through the adjustment of the gain α (voltage division factor) of the feedback voltage Vfb, the peak current value of the primary current Ip can be raised.

<Package Layout>

Figure 13:
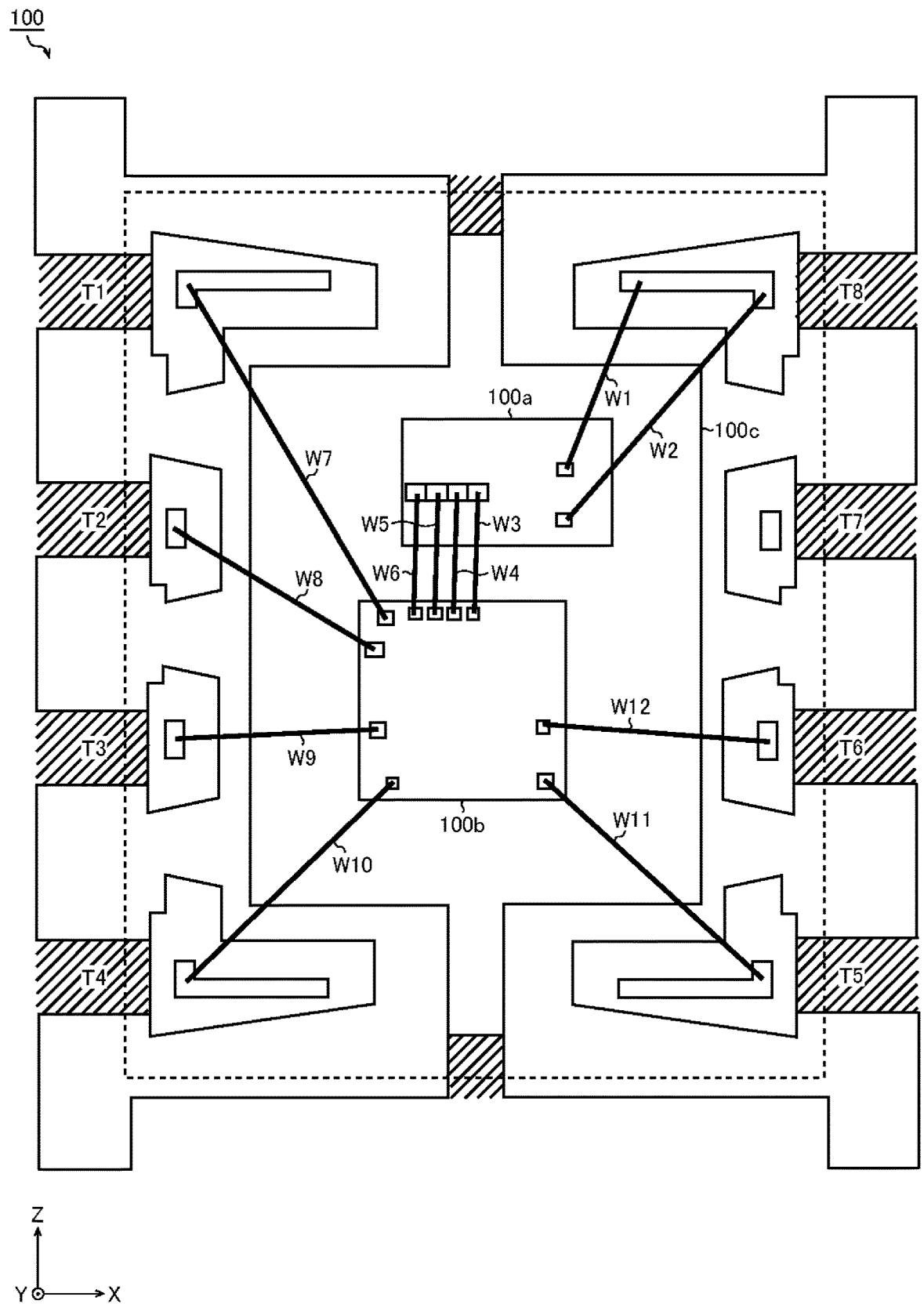
FIG. 13 is a diagram showing one example of a package layout.

FIG. 13 is a diagram (a view along the XZ plane) showing one example of a package layout. In the power IC 100 shown there, a first chip 100*a* and a second chip 100*b* are mounted on an island 100*c*.

The first chip 100*a* has integrated in it circuit blocks that need to withstand high voltages (such as the starter 109, which accepts the input of the high voltage VH). The first chip 100*a* is connected to the external terminal T8 via wires W1 and W2. The first chip 100a is connected to the second chip 100b via wires W3 to W6.

The second chip 100b has integrated in it circuit blocks (101 to 108 and 110 to 119) other than those mentioned above. The second chip 100b is connected to the external terminals T1 to T6 via wires W7 to W12 respectively.

In the package layout shown in FIG. 13, on the island 100c, the first chip 100a is disposed nearer to a second edge (the side close to pins 5 to 7), and the second chip 100b is disposed nearer to a first edge (the side close to pins 1 to 4). With this package layout, the wires W1 to W12 can be laid over as short distances as possible.

The reason that the power IC 100 is designed not in a one-chip structure but in a two-chip structure is as follows. If, for argument's sake, circuit blocks that need to withstand high voltages and other circuit blocks are integrated in one chip, there has to be provided a buffering region between a high-withstand-voltage process region and a low-withstand-voltage process region. This results in a great increase in chip size and hence a huge increase in costs.

By contrast, designing the power IC 100 in a two-chip structure eliminates the need to provide a buffering region in either of the first and second chips 100a and 100b. It is thus possible to reduce the size of each chip and eventually reduce costs. Moreover, the separation of the first and second chips 100a and 100b from each other is extremely advantageous in terms of withstand voltage.

<Overview>

To follow is an overview of the various embodiments disclosed herein.

According to one aspect of what is disclosed herein, a power control device acts as a principal controlling agent in an isolating switching power supply, and includes: a controller configured to monitor a first output detection signal commensurate with a direct-current output voltage to a load and a second output detection signal commensurate with the difference between the direct-current output voltage and its target value to switch among a plurality of operating modes with varying power consumption in accordance with the results of monitoring of the first and second output detection signals (a first configuration).

Preferably, the power control device of the first configuration described above has, as the plurality of operating modes, a regular mode and at least one power-saving mode. Here, preferably, the controller is configured to switch operating modes between the regular mode and a power-saving mode, or among a plurality of power-saving modes, in accordance with the result of monitoring of the first output detection signal, and to return to the regular mode in accordance with the result of monitoring of the second output detection signal (a second configuration).

In the power control device of the second configuration described above, preferably, the controller is configured to determine whether or not to perform burst control of an output switch in accordance with the result of monitoring of the second output detection signal (a third configuration).

Preferably, the power control device of the third configuration described above further includes a peak current switch configured to switch the peak current value of a primary current passing in the output switch among the plurality of operating modes (a fourth configuration).

Preferably, the power control device of the fourth configuration described above has, as the power-saving mode, a light-load mode in which current consumption is reduced compared to in the regular mode and the peak current value at burst termination is raised, and a no-load mode in which a burst stop period is controlled to be longer than a predetermined value and in which current consumption during the burst stop period is reduced compared to in the light-load mode and the peak current value at burst termination is further raised (a fifth configuration).

According to another aspect of what is disclosed herein, an isolating switching power supply includes: the power control device of any of the first to fifth configurations described above; and a switching output stage configured to be controlled by the power control device (a sixth configuration).

In the isolating switching power supply of the sixth configuration described above, preferably, the switching output stage functions as a component of a DC-DC converter configured to, while electrically isolating a primary circuit system and a secondary circuit system from each other by use of a transformer, generate the direct-current output voltage from a direct-current input voltage supplied to the primary circuit system to supply the direct-current output voltage to the load in the secondary circuit system (a seventh configuration).

In the isolating switching power supply of the seventh configuration described above, preferably, the varying of the direct-current output voltage is controlled in the secondary circuit system (an eighth configuration).

Preferably, the isolating switching power supply of the eighth configuration described above further includes a rectifier configured to generate the direct-current input voltage from an alternating-current input voltage (a ninth configuration).

According to another aspect of what is disclosed herein, an electronic appliance includes: the isolating switching power supply of any of the sixth to ninth configurations described above; and a load configured to operate by being supplied with electric power from the isolating switching power supply (a tenth configuration).

According to another aspect of what is disclosed herein, a power control device acts as a principal controlling agent in an isolating switching power supply, and includes: a peak current switch configured to raise the peak current value of a primary current passing in an output switch on detecting a light load (an eleventh configuration).

Preferably, the power control device of the eleventh configuration described above further includes an on-duty controller configured to control the on-duty of the output switch based on an output detection signal commensurate with the difference between a direct-current output voltage to a load and its target value, and the peak current switch is configured to raise the peak current value by adjusting the gain of the output detection signal on detecting a light load (a twelfth configuration).

In the power control device of the twelfth configuration described above, preferably, the output detection signal is a voltage signal, and the gain is a voltage division factor (a thirteenth configuration).

Preferably, the power control device of the twelfth or thirteenth configuration described above further includes a controller configured to determine whether or not to perform burst control of the output switch in accordance with the result of monitoring of the output detection signal (a fourteenth configuration).

In the power control device of the fourteenth configuration described above, the peak current switch is configured to raise the peak current value when the controller performs burst control of the output switch (a fifteenth configuration).

In the power control device of the fourteenth or fifteenth configuration described above, preferably, the peak current switch is configured to raise the peak current value when the burst stop period of the output switch becomes longer than a predetermined value (a sixteenth configuration).

According to another aspect of what is disclosed herein, an isolating switching power supply includes: the power control device of any of the eleventh to sixteenth configurations described above; and a switching output stage configured to be controlled by the power control device (a seventeenth configuration).

In the isolating switching power supply of the seventeenth configuration described above, preferably, the switching output stage functions as a component of a DC-DC converter configured to, while electrically isolating a primary circuit system and a secondary circuit system from each other by use of a transformer, generate the direct-current output voltage from a direct-current input voltage supplied to the primary circuit system to supply the direct-current output voltage to the load in the secondary circuit system (an eighteenth configuration).

Preferably, the isolating switching power supply of the eighteenth configuration described above further includes a rectifier configured to generate the direct-current input voltage from an alternating-current input voltage (a nineteenth configuration).

According to another aspect of what is disclosed herein, an electronic appliance includes: the isolating switching power supply of any of the seventeenth to nineteenth configurations described above; and a load configured to operate by being supplied with electric power from the isolating switching power supply (a twentieth configuration).

The various technical features disclosed herein may be implemented in any other manner than as in the embodiments described above, and allow for many modifications without departing from the spirit of the present invention. That is, the embodiments descried above should be understood to be in every aspect illustrative and not restrictive. The technical scope of the present invention is defined not by the description of the embodiments given above but by the appended claims, and should be understood to encompass any modifications made in the sense and scope equivalent to those of the claims.

INDUSTRIAL APPLICABILITY

The invention disclosed herein finds application in isolating switching power supplies used in any fields (such as in the fields of household appliances, automobiles, and industry machinery).

What is claimed is:

1. A power control device operable to control an output switch of an isolating switching power supply, the power control device comprising:
a controller configured to:
monitor a first output detection signal commensurate with a direct-current output voltage to a load, and a second output detection signal commensurate with a difference between the direct-current output voltage and a target value, and
switch among a plurality of operating modes with varying power consumption in accordance with results of monitoring of the first and second output detection signals,
wherein the power control device has, as the plurality of operating modes, a regular mode and at least one power-saving mode,
wherein the controller is further configured to:
switch operating modes between the regular mode and the at least one power-saving mode, or among a plurality of the at least one power-saving modes, in accordance with the result of monitoring of the first output detection signal in an off-period of the output switch,
return instantly to the regular mode in accordance with the result of monitoring of the second output detection signal regardless of the result of monitoring of the first output detection signal, and
determine whether or not to perform burst control of the output switch in accordance with the result of monitoring of the second output detection signal, and
wherein the power control device further comprises a peak current switch configured to switch a peak current value of a primary current passing in the output switch among the plurality of operating modes.

2. The power control device according to claim 1, wherein the power control device has, as the at least one power-saving mode:
a light-load mode in which current consumption is reduced compared to in the regular mode and the peak current value at burst termination is raised; and
a no-load mode in which a burst stop period is controlled to be longer than a predetermined value and in which current consumption during the burst stop period is reduced compared to in the light-load mode and the peak current value at burst termination is further raised.

3. An isolating switching power supply comprising:
the power control device according to claim 1; and
a switching output stage configured to be controlled by the power control device.

4. The isolating switching power supply according to claim 3, wherein
the switching output stage functions as a component of a DC-DC converter configured to, while electrically isolating a primary circuit system and a secondary circuit system from each other by use of a transformer, generate the direct-current output voltage from a direct-current input voltage supplied to the primary circuit system to supply the direct-current output voltage to the load in the secondary circuit system.

5. The isolating switching power supply according to claim 4, wherein varying of the direct-current output voltage is controlled in the secondary circuit system.

6. The isolating switching power supply according to claim 5, further comprising a rectifier configured to generate the direct-current input voltage from an alternating-current input voltage.

7. An electronic appliance comprising:
the isolating switching power supply according to claim 3; and
the load configured to operate by being supplied with electric power from the isolating switching power supply.

8. A power control device that acts as a principal controlling agent in an isolating switching power supply, the power control device comprising:
a peak current switch configured to raise a peak current value of a primary current passing in an output switch on detecting a light load, and
an on-duty controller configured to control an on-duty of the output switch based on an output detection signal commensurate with a difference between a direct-current output voltage to a load and a target value, wherein
the peak current switch is configured to raise the peak current value by adjusting a gain of the output detection signal on detecting a light load.

9. The power control device according to claim 8, wherein the output detection signal is a voltage signal, and the gain is a voltage division factor.

10. The power control device according to claim 8, further comprising a controller configured to determine whether or not to perform burst control of the output switch in accordance with a result of monitoring of the output detection signal.

11. The power control device according to claim 10, wherein the peak current switch is configured to raise the peak current value when the controller performs burst control of the output switch.

12. The power control device according to claim 10, wherein the peak current switch is configured to raise the peak current value when a burst stop period of the output switch becomes longer than a predetermined value.

13. An isolating switching power supply comprising:
the power control device according to claim 8; and
a switching output stage configured to be controlled by the power control device.

14. The isolating switching power supply according to claim 13, wherein the switching output stage functions as a component of a DC-DC converter configured to, while electrically isolating a primary circuit system and a secondary circuit system from each other by use of a transformer, generate a direct-current output voltage from a direct-current input voltage supplied to the primary circuit system to supply the direct-current output voltage to a load in the secondary circuit system.

15. The isolating switching power supply according to claim 14, further comprising a rectifier configured to generate the direct-current input voltage from an alternating-current input voltage.

16. An electronic appliance comprising:
the isolating switching power supply according to claim 13; and
a load configured to operate by being supplied with electric power from the isolating switching power supply.

17. A power control device that acts operable to act as a principal controlling agent in an isolating switching power supply, the power control device comprising:
a controller configured to:
monitor a first output detection signal commensurate with a direct-current output voltage to a load, and a second output detection signal commensurate with a difference between the direct-current output voltage and a target value, and
switch among a plurality of operating modes with varying power consumption in accordance with results of monitoring of the first and second output detection signals, and
a peak current switch configured to switch a peak current value of a primary current passing in an output switch among the plurality of operating modes.

18. The power control device according to claim 17, wherein the controller is configured to determine whether or not to perform burst control of the output switch in accordance with the result of monitoring of the second output detection signal, and
the power control device has, as the plurality of operating modes:
a regular mode;
a light-load mode in which current consumption is reduced compared to in the regular mode and the peak current value at burst termination is raised; and
a no-load mode in which a burst stop period is controlled to be longer than a predetermined value and in which current consumption during the burst stop period is reduced compared to in the light-load mode and the peak current value at burst termination is further raised.

* * * * *